(12) United States Patent
Kim et al.

(10) Patent No.: US 8,810,908 B2
(45) Date of Patent: *Aug. 19, 2014

(54) BINOCULARS WITH MICROMIRROR ARRAY LENSES

(75) Inventors: Hye Young Kim, Jeonbuk (KR); Jin Young Sohn, Fullerton, CA (US); Gyoung Il Cho, Seoul (KR); Cheong Soo Seo, Seongnam (KR)

(73) Assignees: Stereo Display, Inc., Anaheim, CA (US); Angstrom, Inc., Seongnam (KR)

( * ) Notice: Subject to any disclaimer, the term of this patent is extended or adjusted under 35 U.S.C. 154(b) by 561 days.

This patent is subject to a terminal disclaimer.

(21) Appl. No.: 12/050,918

(22) Filed: Mar. 18, 2008

(65) Prior Publication Data

US 2009/0237783 A1 Sep. 24, 2009

(51) Int. Cl.
*G02B 23/00* (2006.01)
*G02B 23/12* (2006.01)
*G02B 5/08* (2006.01)

(52) U.S. Cl.
CPC .............. *G02B 23/12* (2013.01); *G02B 23/00* (2013.01); *G02B 5/08* (2013.01)
USPC ........... 359/407; 359/421; 359/425; 359/290; 359/399

(58) Field of Classification Search
USPC .................. 359/364–366, 399–435, 850–861
See application file for complete search history.

(56) References Cited

U.S. PATENT DOCUMENTS

| | | | |
|---|---|---|---|
| 2,002,376 A | 5/1935 | Mannhelmer | |
| 4,407,567 A | 10/1983 | Michelet | |
| 4,718,753 A * | 1/1988 | Gebelein | 359/364 |
| 4,834,512 A | 5/1989 | Austin | |
| 4,853,787 A | 8/1989 | Kurth | |
| 4,944,580 A | 7/1990 | MacDonald | |
| 5,004,319 A | 4/1991 | Smither | |
| 5,144,476 A * | 9/1992 | Kebo | 359/366 |
| 5,172,235 A | 12/1992 | Wilm | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,661,518 A | 8/1997 | Palm | |
| 5,696,619 A | 12/1997 | Knipe | |
| 5,748,199 A | 5/1998 | Palm | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michalicek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,233,087 B1 | 5/2001 | Hawkins | |
| 6,282,213 B1 | 8/2001 | Gutin | |
| 6,304,263 B1 | 10/2001 | Chiabrera | |
| 6,315,423 B1 | 11/2001 | Yu | |

(Continued)

*Primary Examiner* — Thong Nguyen

(57) ABSTRACT

The binoculars of the present invention comprise two optical units; one optical unit for each eye. Each optical unit comprises a first reflector element and a second reflector element, wherein at least one of the reflector elements is a micromirror array reflector. The binoculars of the present invention provide focusing and/or zoom functions without or with minimal macroscopic mechanical lens movement.

24 Claims, 21 Drawing Sheets

(56) References Cited

U.S. PATENT DOCUMENTS

| | | | |
|---|---|---|---|
| 6,329,737 B1 | 12/2001 | Jerman | |
| 6,329,963 B1 | 12/2001 | Chiabrera | |
| 6,330,102 B1 * | 12/2001 | Daneman et al. | 359/290 |
| 6,421,081 B1 | 7/2002 | Markus | |
| 6,438,272 B1 | 8/2002 | Huang | |
| 6,498,673 B1 | 12/2002 | Frigo | |
| 6,507,366 B1 | 1/2003 | Lee | |
| 6,549,730 B1 | 4/2003 | Hamada | |
| 6,600,591 B2 | 7/2003 | Anderson | |
| 6,611,343 B1 | 8/2003 | Frankowski | |
| 6,618,209 B2 | 9/2003 | Nishioka | |
| 6,625,342 B2 | 9/2003 | Staple | |
| 6,649,852 B2 | 11/2003 | Chason | |
| 6,650,461 B2 | 11/2003 | Atobe | |
| 6,658,208 B2 | 12/2003 | Watanabe | |
| 6,711,319 B2 | 3/2004 | Hoen | |
| 6,735,014 B2 * | 5/2004 | Paramythioti | 359/434 |
| 6,741,384 B1 | 5/2004 | Martin | |
| 6,781,731 B2 | 8/2004 | Choi | |
| 6,781,732 B2 | 8/2004 | Cho | |
| 6,784,771 B1 | 8/2004 | Fan | |
| 6,801,260 B1 | 10/2004 | Veksland | |
| 6,804,429 B2 | 10/2004 | Yu | |
| 6,833,938 B2 | 12/2004 | Nishioka | |
| 6,836,459 B2 | 12/2004 | Komoto | |
| 6,870,660 B2 | 3/2005 | DiCarlo | |
| 6,885,819 B2 | 4/2005 | Shinohara | |
| 6,900,901 B2 | 5/2005 | Harada | |
| 6,900,922 B2 | 5/2005 | Aubuchon | |
| 6,906,848 B2 | 6/2005 | Aubuchon | |
| 6,906,849 B1 | 6/2005 | Mi | |
| 6,909,453 B2 | 6/2005 | Mochizuki | |
| 6,914,712 B2 | 7/2005 | Kurosawa | |
| 6,919,982 B2 | 7/2005 | Nimura | |
| 6,934,072 B1 | 8/2005 | Kim | |
| 6,934,073 B1 | 8/2005 | Kim | |
| 6,943,950 B2 | 9/2005 | Lee | |
| 6,944,103 B2 | 9/2005 | Hong | |
| 6,956,687 B2 | 10/2005 | Moon | |
| 6,958,777 B1 | 10/2005 | Pine | |
| 6,970,284 B1 | 11/2005 | Kim | |
| 6,971,116 B2 | 11/2005 | Takeda | |
| 6,985,299 B2 | 1/2006 | Bakin | |
| 6,995,897 B2 | 2/2006 | Mushika | |
| 6,995,909 B1 | 2/2006 | Hayashi | |
| 6,999,226 B2 | 2/2006 | Kim | |
| 7,009,561 B2 | 3/2006 | Menache | |
| 7,019,376 B2 | 3/2006 | Patel | |
| 7,023,466 B2 | 4/2006 | Favalora | |
| 7,025,461 B2 | 4/2006 | Veligdan | |
| 7,027,207 B2 | 4/2006 | Huibers | |
| 7,031,046 B2 | 4/2006 | Kim | |
| 7,046,447 B2 | 5/2006 | Raber | |
| 7,057,826 B2 | 6/2006 | Cho | |
| 7,068,415 B2 | 6/2006 | Mushika | |
| 7,068,416 B2 | 6/2006 | Gim | |
| 7,077,523 B2 | 7/2006 | Seo | |
| 7,079,325 B2 | 7/2006 | Konno | |
| 7,088,493 B2 | 8/2006 | Alain | |
| 7,091,057 B2 | 8/2006 | Gan | |
| 7,095,548 B1 * | 8/2006 | Cho et al. | 359/298 |
| 7,127,136 B2 | 10/2006 | Hall | |
| 7,161,729 B2 | 1/2007 | Kim | |
| 7,164,465 B2 | 1/2007 | Klosner | |
| 7,173,653 B2 | 2/2007 | Gim | |
| 7,184,192 B2 | 2/2007 | Sandstrom | |
| 7,195,163 B2 | 3/2007 | Yoo | |
| 7,209,286 B2 | 4/2007 | Mann | |
| 7,212,330 B2 | 5/2007 | Seo | |
| 7,215,882 B2 | 5/2007 | Cho | |
| 7,239,438 B2 | 7/2007 | Cho | |
| 7,245,325 B2 | 7/2007 | Yamaguchi | |
| 7,245,363 B2 | 7/2007 | Mushika | |
| 7,261,417 B2 | 8/2007 | Cho | |
| 7,267,447 B2 | 9/2007 | Kim | |
| 7,274,517 B2 | 9/2007 | Cho | |
| 7,306,344 B2 | 12/2007 | Abu-Ageel | |
| 7,315,503 B2 | 1/2008 | Cho | |
| 7,333,260 B2 | 2/2008 | Cho | |
| 7,339,746 B2 | 3/2008 | Kim | |
| 7,354,167 B2 | 4/2008 | Cho | |
| 7,355,627 B2 | 4/2008 | Yamazaki | |
| 7,370,412 B2 | 5/2008 | Hiraoka | |
| 7,463,342 B2 * | 12/2008 | Kim et al. | 356/29 |
| 2002/0030636 A1 * | 3/2002 | Richards | 345/8 |
| 2003/0174234 A1 | 9/2003 | Kondo | |
| 2004/0021802 A1 | 2/2004 | Yoshino | |
| 2004/0184146 A1 | 9/2004 | Uehara | |
| 2004/0207768 A1 | 10/2004 | Liu | |
| 2005/0206773 A1 | 9/2005 | Kim | |
| 2005/0207486 A1 | 9/2005 | Lee | |
| 2005/0212856 A1 | 9/2005 | Temple | |
| 2005/0259158 A1 | 11/2005 | Jacob | |
| 2006/0007301 A1 | 1/2006 | Cho | |
| 2006/0120706 A1 * | 6/2006 | Cho et al. | 396/17 |
| 2006/0146140 A1 | 7/2006 | Kennedy | |
| 2006/0209423 A1 * | 9/2006 | Kim et al. | 359/676 |
| 2006/0209439 A1 | 9/2006 | Cho | |
| 2006/0221179 A1 * | 10/2006 | Seo et al. | 348/46 |
| 2006/0256332 A1 | 11/2006 | Sandstrom | |
| 2007/0263113 A1 | 11/2007 | Baek | |

* cited by examiner

BINOCULARS WITH MICROMIRROR ARRAY LENSES

FIELD OF THE INVENTION

The present invention relates to binoculars in general, and more specifically to the binoculars with micromirror array reflectors.

BACKGROUND OF THE INVENTION

A pair of binoculars provides three-dimensional magnified images using two parallel mirror-symmetric optical units. In the conventional binoculars, each optical unit comprises an objective lens group, a prism lens group, and an ocular lens group. The objective lens group gathers incident light from an object. The prism lens group typically comprising two prisms is configured to change and fold the path of light and provide an upright image. The ocular lens group magnifies the image formed by the objective lens group and the prism lens group. As the object distance is changed, the focus of the binoculars should be adjusted unless the optical units have a long depth of field. In the conventional binoculars, the distance between the objective lens group and the ocular lens group is configured to be adjusted by macroscopic mechanical lens movement in order to change the focus of the binoculars. However, the repeated macroscopic mechanical lens movement can cause wear and tear and misalignment problems. Also, the moving mechanism and multiple prisms can add significant weight to the binoculars which may adversely affect to their portability.

Binoculars having zoom function have not been used widely because they require complicated macroscopic mechanical lens movement and precise collimation of optical elements. Also, the image quality of the conventional binoculars having zoom function is inferior to that of fixed magnification binoculars because it is very difficult to correct the optical aberration of the binoculars throughout an entire zoom range. Therefore, the conventional binoculars having zoom function tend to be bulky, fragile, and expensive with inferior image quality, which are undesirable especially for outdoor use. Therefore, most conventional binoculars provide a fixed power.

The advanced binoculars should be light weighted and ragged with high image quality. Also, they should be able to provide focusing and/or zoom functions for versatile use.

SUMMARY OF INVENTION

The present invention addresses the problems of the prior art and provides binoculars with micromirror array reflectors, which are capable of providing focusing and/or zoom functions without or with minimal macroscopic mechanical lens movement. Also, the present invention provides low cost, light weight, and high image quality binoculars.

A pair of binoculars with micromirror array reflector of the present invention comprises two optical units; one optical unit for each eye. The distance between optical units can be changed to accommodate viewers having different eye separation. For example, two optical units can be rotatably connected to each other in order to change the distance between the optical units. Each of the optical units comprises a first reflector element and a second reflector element. The first reflector element is disposed to reflect light from the objective side to the second reflector element and the second reflector element is disposed to reflect the light reflected from the first reflector element to the eye side. In the binoculars of the present invention, at least one of the reflector elements is a micromirror array reflector, wherein the micromirror array reflector is used to change the optical properties of the reflector unit in order to provide focusing and/or zoom functions. The micromirror array reflector comprises a plurality of micromirrors having reflective surfaces and configured to have a plurality of motions. The micromirror array reflector is configured to have a plurality of optical surface profiles by controlling the motions of the micromirrors.

In the binoculars of the present invention, the micromirror array reflector forms a plurality of predetermined optical surface profiles. Each optical surface profile formed by each micromirror array reflector reproduces a reflective optical surface with a predetermined optical property. Each optical surface profile formed by the micromirror array reflector satisfies the convergence condition and the phase matching condition.

Since the micromirror array reflector is capable of reproducing virtually any reflective optical surface by controlling the motions of the micromirrors, the micromirror array reflector makes the focus and/or the magnification of the binoculars changed by changing its optical surface profile without macroscopic mechanical lens movement.

Each optical unit may further comprise an objective lens or lens group disposed to the object side. Also, each optical unit may further comprise an ocular lens or lens group disposed to the eye side. The objective lens or lens group gathers incident light and the ocular lens or lens group magnifies the image formed by the rest of the lens elements. The binoculars of the present invention may further comprise an erect lens or lens group in order to obtain an upright image.

Each optical unit can further comprise a beam splitter, wherein the beam splitter is disposed between the first reflector element and the second reflector element. The beam splitter reflects light from the objective side to the first reflector element, the first reflector element reflects the light reflected from the beam splitter to the second reflector element, the second reflector element reflects the light reflected from the first reflector element to the beam splitter, and the beam splitter reflects the light reflected from the second reflector element to the eye side.

In each optical unit, the micromirror array reflector is configured to change the focus of the optical unit by changing the optical surface profile of the micromirror array reflector.

In each optical unit, the micromirror array reflector is a variator configured to change the magnification of the optical unit by changing the optical surface profile of the micromirror array reflector.

In each optical unit, the micromirror array reflector is a compensator configured to maintain the focus of the optical unit by changing the optical surface profile of the micromirror array reflector.

Each optical unit can have a telescope type configuration having a primary mirror and a secondary mirror, wherein the primary mirror is the first reflector element and the secondary mirror is the second reflector element. Each optical unit can have a Cassegrainian type telescope configuration. Also, each optical unit can have a Gregorian type telescope configuration. The first reflector element can have an opening, wherein the light can pass through the first reflector element.

In each optical unit, the first reflector element is a mirror and the second reflector element is the micromirror array reflector.

In each optical unit, the first reflector element is the micromirror array reflector and the second reflector element is a mirror.

In each optical unit, the first reflector element is a first micromirror array reflector and the second reflector element is a second micromirror array reflector.

The binoculars of the present invention can use conventional lens elements along with micromirror array reflectors. The conventional lens elements include movable lenses and variable focus lenses. The movable lenses have macroscopic mechanical lens movement. The variable focus lens can change its focal length without macroscopic mechanical lens movement. The variable focus lens can be a non-micromirror array type lens such as a liquid crystal lens.

In each optical unit, the objective lens group comprises at least movable lens working as a variator to change the magnification of the optical unit by changing the position of the movable lens.

In each optical unit, the objective lens group comprises at least one movable lens working as a compensator to maintain the focus of the optical unit by changing the position of the movable lens.

In wherein in each optical unit, the ocular lens group comprises at least one movable lens working as a variator to change the magnification of the optical unit by changing the position of the movable lens.

In each optical unit, the objective lens group comprises at least one working as a compensator to maintain the focus of the optical unit by changing the position of the movable lens.

In each optical unit, the objective lens group comprises at least one a variable focus lens working as a variator to change the magnification of the optical unit by changing the focal length of the variable focus lens.

In each optical unit, the objective lens group comprises at least one a variable focus lens working as a compensator to maintain the focus of the optical unit by changing the focal length of the variable focus lens.

In each optical unit, the ocular lens group comprises at least one a variable focus lens working as a variator to change the magnification of the optical unit by changing the focal length of the variable focus lens.

In each optical unit, the ocular lens group comprises at least one a variable focus lens working as a compensator to maintain the focus of the optical unit by changing the focal length of the variable focus lens.

The binoculars further comprise at least one viewer adjustment means, wherein viewer adjusts the optical surface profiles of the micromirror array reflectors by the viewer adjustment means. The viewer generates a command signal with the viewer adjustment means to change the optical surface profiles of the micromirror array reflectors. The viewer adjustment means can be a viewer focus adjustment means if the micromirror array reflectors are used for focusing function. The viewer adjustment means can be a viewer magnification adjustment means if the micromirror array reflectors are used for zoom function.

The present invention provides a pair of binoculars with micromirror array reflector having zoom function without macroscopic mechanical lens movement. The binoculars comprise two optical units, wherein each of the optical units comprises a first micromirror array reflector and a second micromirror array reflector. Each micromirror array reflector comprises a plurality of micromirrors, wherein each micromirror has a reflective surface and is configured to have a plurality of motions. Each micromirror array reflector is configured to have a plurality of optical surface profiles by controlling the motions of the micromirrors. The first micromirror array reflector is configured to change the magnification of the optical unit by changing the optical surface profile of the first micromirror array reflector. The second micromirror array reflector is configured to maintain the focus of the optical unit by changing the optical surface profile of the second micromirror array reflector.

The present invention provides a pair of binoculars with micromirror array reflector having focusing function without macroscopic mechanical lens movement. The binoculars comprise two optical units, wherein each of the optical units comprises a mirror and a micromirror array reflector. The micromirror array reflector comprises a plurality of micromirrors, wherein each micromirror has a reflective surface and is configured to have a plurality of motions. The micromirror array reflector is configured to have a plurality of optical surface profiles by controlling the motions of the micromirrors. The micromirror array reflector is configured to change the focus of the optical unit by changing the optical surface profile of the micromirror array reflector.

DETAILED DESCRIPTION OF EMBODIMENTS

The present invention will now be described in detail with reference to embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A pair of binoculars provides three-dimensional magnified images using two optical units. These two optical units are configured to provide images formed from at slightly different angles so that a viewer can see a three-dimensional image. The binoculars typically have focusing function to accommodate changes in distance between an object and the binoculars. In addition, the binoculars can have zoom function to provide variable magnification. The conventional binoculars achieve these functions by using macroscopic mechanical lens movement.

Figure 1A:
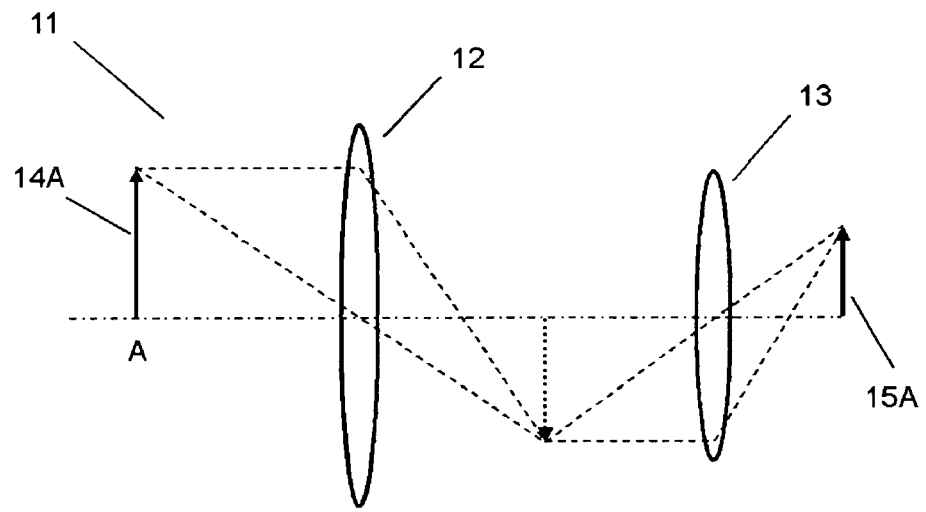
FIGS. 1A-1B are schematic diagrams showing how focusing function is performed in conventional binoculars.
Figure 1B:
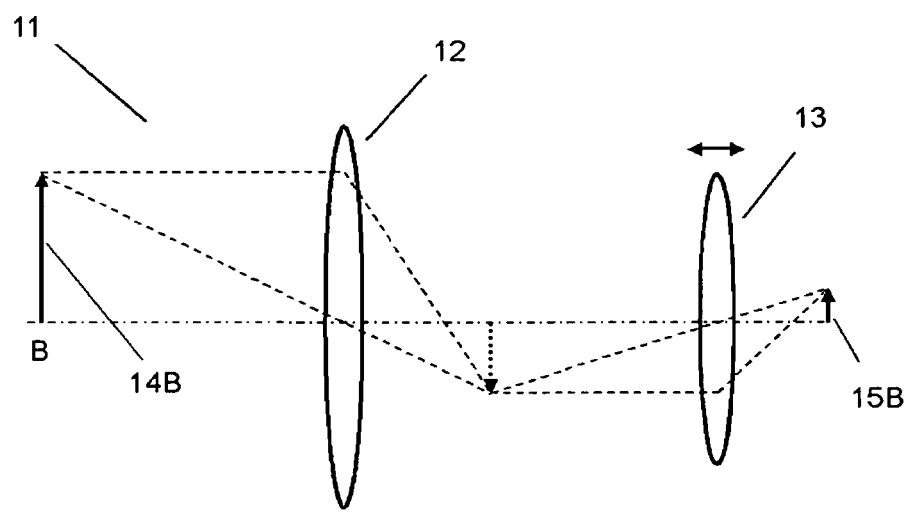

FIGS. 1-2 show how these focusing and/or zoom functions are performed in conventional binoculars. Although the binoculars comprise two optical units, the configuration and operation of the binoculars is illustrated for only one optical unit for simplicity. The other optical unit has the identical or mirror-symmetric configuration and operation. FIGS. 1A-1B are schematic diagrams showing how focusing function is performed in the conventional binoculars. In the conventional binoculars 11, each optical unit comprises an objective lens 12 configured to gather incident light and an ocular lens 13 configured to magnify an image formed by the objective lens 12. In practice, the conventional binoculars can use groups of lenses in the places of the objective lens 12 or the ocular lens 13. When different objects are viewed or the object is moving, the distance between the object and the binoculars 11 (object distance) is changed. Therefore, the binoculars 11 have to be refocused so that the focused image can be obtained. The focus can be adjusted by changing the distance between the objective lens 12 and the ocular lens 13. Typically, at least one of the object lens 12 and the ocular lens 13 is moved to change this distance. The conventional binoculars 11 usually include at least one manual viewer focus adjustment means (not shown) configured for a viewer to change the distance between the objective lens 12 and the ocular lens 13; for example, a focusing wheel. Instead, the binoculars can be configured to be operated electrically. In this case, the viewer can adjust the distance between the objective lens 12 and the ocular lens 13 simply by generating a electric signal using an electric viewer focus adjustment means such as a set of buttons, a wheel, a dial, a slider, a touch screen, and so on. FIGS. 1A-1B show the case that the ocular lens 13 is moved for focusing. In FIG. 1A, the objective lens 12 and the ocular lens 13 are positioned such that the object 14A located at the position A is focused, wherein the viewer can see the focused image 15A of the object 14A through the binoculars 11. With the same lens positions as those of FIG. 1A, the image of the object 14B in the FIG. 1B will be defocused. To obtain the focused image, the viewer adjusts the position of the ocular lens 13 using the viewer focus adjustment means until the focused image 1513 of the object 14B is obtained.

Figure 2A:
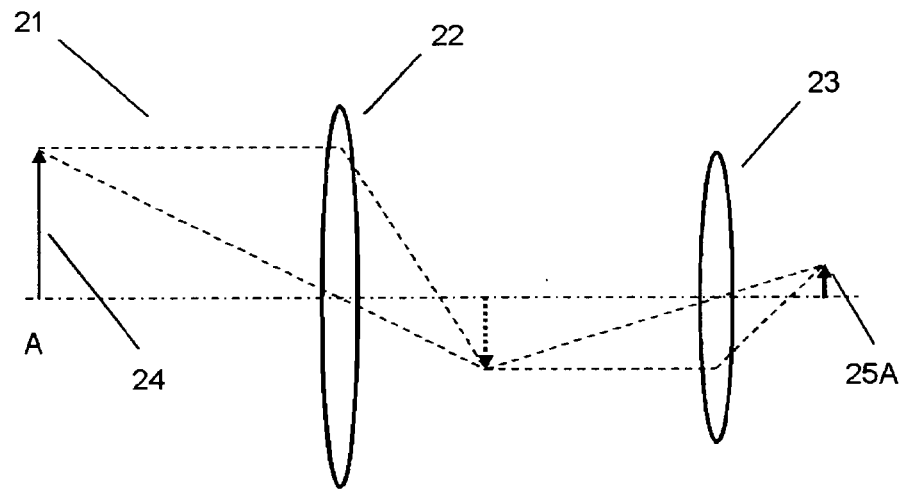
FIGS. 2A-2B are schematic diagrams showing how zoom function is performed in conventional zoom binoculars.
Figure 2B:
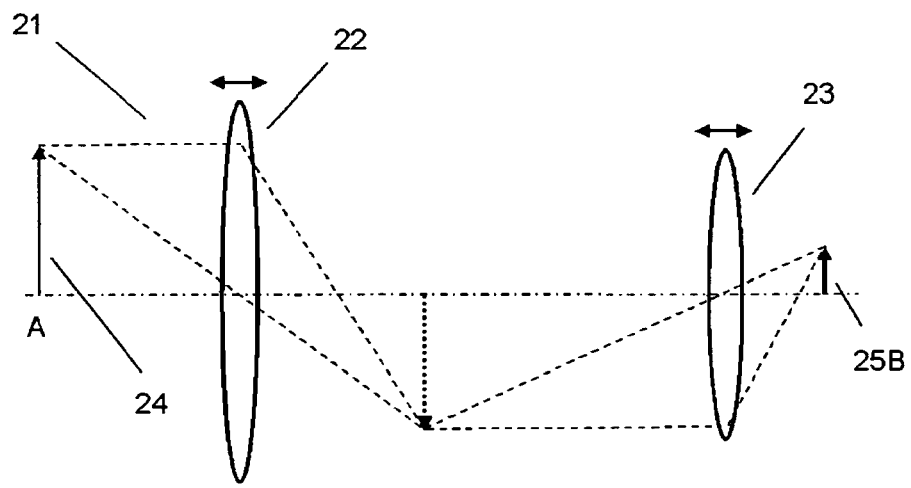

FIGS. 2A-2B are schematic diagrams showing how zoom function is performed in conventional zoom binoculars. In the conventional zoom binoculars 21, each optical unit typically comprises at least two movable lenses. One movable lens called a variator 22 is configured to change the magnification of the optical unit by changing its position and the other movable lens called a compensator 23 is configured to maintain the focus of the optical unit throughout a zoom range by changing its position. In FIG. 2A, the variator 22 and the compensator 23 are positioned such that the object 24 located at the position A is focused at one magnification, wherein a viewer can see the focused image 25A of the object 24 through the binoculars 21. The variator 22 is moved to change the magnification of the optical unit as shown in FIG. 2B. The conventional zoom binoculars 21 have at least one manual or electrical viewer magnification adjustment means (not shown) similar to the viewer focus adjustment means described in FIG. 1 to change the magnification of the binoculars. As the position of the variator 22 is changed, the image of the object 24 is defocused because the position of an image plane is also changed. To obtain the focused image, the movement of the compensator 23 can be synchronized with the movement of the variator 22, wherein the movement of the compensator 23 is predetermined based on the magnification of the optical unit and the object distance, In this case, the compensator 23 moves automatically to maintain the focus of the optical unit as the variator 22 moves. Alternatively, the viewer can adjust the position of the compensator 23 using the viewer focus adjustment means as shown in FIG. 1 until the focused image 25B of the object 24 is obtained.

As shown in FIGS. 1-2, the conventional binoculars perform zoom and focusing functions by using macroscopic mechanical lens movement. However, the macroscopic mechanical lens movement can pose many problems including wear and tear, bulky and fragile structure, and higher cost with low image quality. The binoculars with micromirror array reflectors of the present invention can provide focusing and/or zoom functions without or with minimal macroscopic mechanical lens movement.

The general principle and methods for making the micromirror array reflector are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 9, 2007, U.S. Pat. No. 6,999,226 issued Feb. 14, 2006 to Kim, U.S. Pat. No. 7,095,548 issued Aug. 22, 2006 to Cho, U.S. patent application Ser. No. 10/893,039 filed Jul. 16, 2004, U.S. patent application Ser. No. 10/983,353 filed Nov. 8, 2004, U.S. patent application Ser. No. 11/076,616 filed Mar. 10, 2005, U.S. patent application Ser. No. 11/426,565 filed Jun. 26, 2006, and U.S. patent application Ser. No. 11/933,105 filed Oct. 31, 2007, and all of which are incorporated herein by references.

The general properties of the micromirror array reflector are disclosed in U.S. Pat. No. 7,057,826 issued Jun. 6, 2006 to Cho, U.S. Pat. No. 7,173,653 issued Feb. 6, 2007, U.S. Pat. No. 7,215,882 issued May 8, 2007 to Cho, U.S. patent application Ser. No. 10/979,568 filed Nov. 2, 2004, U.S. patent application Ser. No. 11/218,814 filed Sep. 2, 2005, U.S. patent application Ser. No. 11/359,121 filed Feb. 21, 2006, U.S. patent application Ser. No. 11/382,273 filed May 9, 2006, and U.S. patent application Ser. No. 11/429,034 filed May 5, 2006, and its application are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934,133 filed Sep. 3, 2004, U.S. patent application Ser. No. 10/979,619 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, U.S. patent application Ser. No. 11/419,480 filed May 19, 2006, and U.S. patent application Ser. No. 11/423,333 filed Jun. 9, 2006, all of which are incorporated herein by references.

The micromirrors in the micromirror array reflector are controlled electrostatically of electromagnetically, wherein the micromirrors can be controlled individually or in group. Each micromirror can have up to three degrees of freedom motion including two degrees of freedom rotational motion and one degree of freedom translational motion. Since the micromirrors in the micromirror array reflector can have a plurality of motions, the micromirror array reflector can form a plurality of optical surface profiles. The micromirror array reflector can change its focal length, field of view, or optical axis by changing its optical surface profile. Therefore, the micromirror array reflector is a variable focusing reflector having a variable optical property. Also, the micromirror array reflector is an adaptive optical component which compensates the aberration of the optical unit. The micromirror array reflector comprising micromirrors has a variable optical property, a very fast response time, a large focal length variation, a high optical focusing efficiency, a simple focusing structure, low power consumption, and a low production cost thanks to a mass production advantage.

To be a good reflector, the reflector must satisfy two conditions. One is the convergence condition that all light rays scattered from one point of an object should converge into one point (focal point) on an image plane. The other is the phase matching condition that all converging light rays should have the same phase at the focal point. To satisfy these reflector conditions, the surfaces of conventional reflectors are fabricated to have all light rays scattered by one point of an object be converged into one point on an image plane and have the Optical Path Length (OPL) of all converging light rays be the same. On the other hand, these reflector conditions are satisfied in a different way in micromirror array reflectors that reproduce the optical surfaces of various conventional reflectors. Each micromirror in a micromirror array reflector is controlled to have rotational and/or translational motion to redirect scattered light rays from one point of an object into a focal point to satisfy the convergence condition. Since the micromirrors of the micromirror array reflector are usually arranged in a flat plane, the OPLs of light lays converged by rotation and/or translation of the micromirrors can be different. Although the OPLs of converging light rays are different, the same phase condition can be satisfied by adjusting the OPL by using the periodicity of light. If the Optical Path Length Difference ($\Delta$OPL) of light rays are integer multiples of a wavelength of light, the phase matching condition is satisfied at the focal point. Since the micromirrors are reflector elements, the required translational motion range of the micromirrors is only half wavelength. The micromirror array reflector satisfies the phase matching condition by adjusting the rotational and/or translational motions of the micromirrors. The rotations of the micromirrors in the micromirror array reflector can be determined by local gradients of an optical surface. Each optical surface profile is formed to satisfy the same phase condition and the convergence condition.

The general principle, structure and methods for making the multiple surface profiles by using discrete motion control of MEMS device are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/426,565 filed Jun. 26, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007, U.S. patent application Ser. No. 11/742,510 filed Apr. 30, 2007, and U.S. patent application Ser. No. 11/762,683 filed Jun. 13, 2007, all of which are incorporated herein by references.

FIGS. 3-18 show various embodiments of the binoculars of the present invention. All embodiments of the binoculars of the present invention have the common configurations as follows. The binoculars of the present invention comprise two optical units; one optical unit for each eye. The distance between optical units can be changed to accommodate viewers having different eye separation. For example, two optical units can be rotatably connected to each other in order to change the distance between the optical units. Each optical unit comprises a first reflector element and a second reflector element. The first reflector element is disposed to reflect light from the objective side to the second reflector element and the second reflector element is disposed to reflect the light reflected from the first reflector element to the eye side. In the present invention, at least one of the reflector elements is a micromirror array reflector.

The micromirror array reflector comprises a plurality of micromirrors. Each micromirror has a reflective surface and is configured to have a plurality of motions. The micromirror can have rotational motion and/or translational motion. The control circuitry controls the motions of the micromirrors electrostatically or electromagnetically. The micromirror array reflector is configured to form a plurality of optical surface profiles by controlling the motions of the micromirrors. These optical surface profiles can be predetermined. Each optical surface profile formed by each micromirror array reflector reproduces a reflective optical surface with a predetermined optical property. Since the micromirror array reflector is capable of reproducing virtually any reflective optical surface by controlling the motions of the micromirrors, the micromirror array reflector enables the binoculars to change the focus and/or the magnification by changing its optical surface profile without macroscopic mechanical lens movement.

The binoculars further comprise at least one viewer adjustment means, wherein the viewer generates a command signal with the viewer adjustment means to change the optical surface profiles of the micromirror array reflectors. The viewer adjustment means can be a viewer focus adjustment means if the micromirror array reflectors are used for focusing function. The viewer adjustment means can be a viewer magnification adjustment means if the micromirror array reflectors are used for zoom function. The viewer adjustment means can be any means that the viewer can interact with the binoculars, which includes such as a set of buttons, a wheel, a dial, a slider, a touch screen, and so on.

The binoculars of the present invention can further comprise the erect lens or lens group in order to obtain an upright image. With these common configurations, many variations will be shown below as possible embodiments of the present invention.

Figure 3:
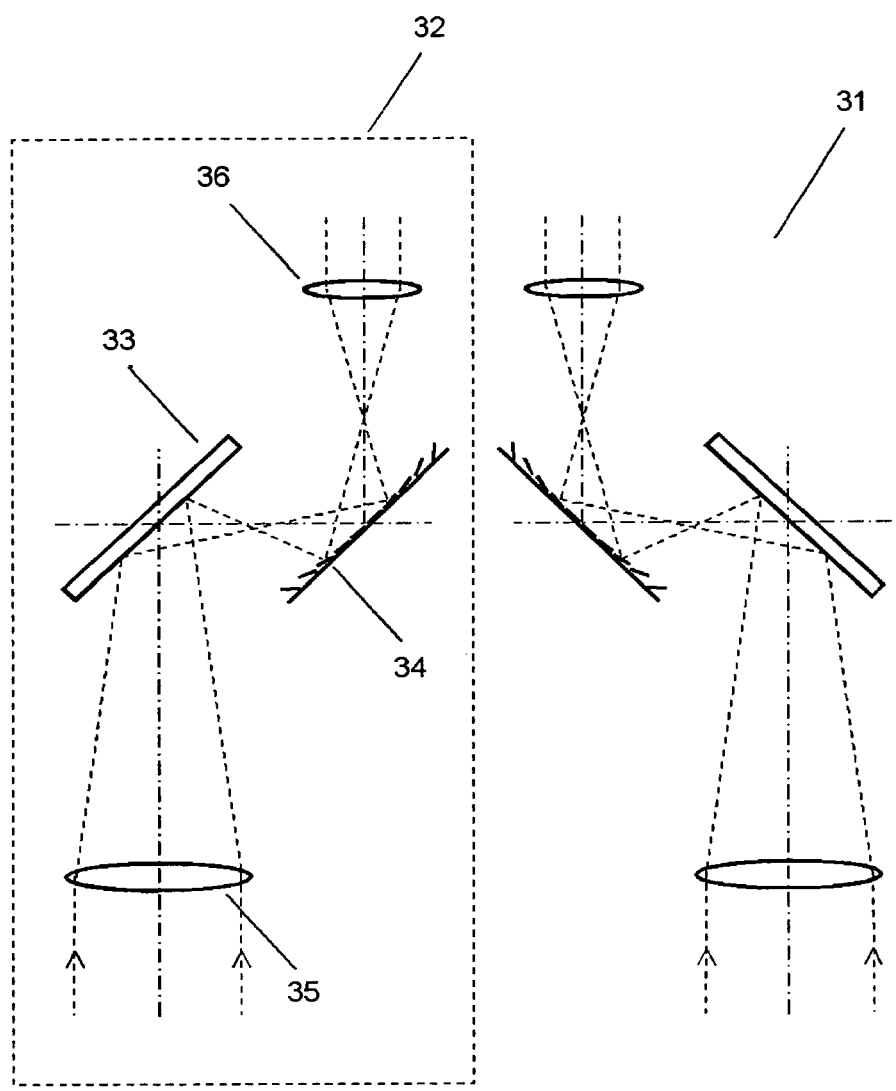
FIG. 3 is a schematic diagram of one embodiment of binoculars with micromirror array reflectors, wherein the binoculars have focusing function without macroscopic mechanical lens movement.

FIG. 3 is a schematic diagram of one embodiment of binoculars with micromirror array reflectors, wherein the binoculars have focusing function without macroscopic mechanical lens movement. Focusing function can be performed if at least one of reflector elements in each optical unit is a micromirror array reflector. As an exemplary embodiment, illustrated is a case of the binoculars 31 that in each optical unit 32, the first reflector elements is a mirror 33 and the second reflector element is a micromirror array reflector 34 configured to change the focus of the optical unit 32 by changing its optical surface profile. The micromirror array reflector 34 has a variable optical property by forming a plurality of optical surface profiles. Each optical surface profile of the micromirror array reflector 34 is predetermined to have a required optical property such as a required focal length. Each optical unit 32 may further comprise an objective lens or lens group 35 and disposed to the object side. Also, each optical unit 32 may further comprise an ocular lens or lens group 36 disposed to the eye side. In this and the rest of figures of this disclosure, each lens group is schematically illustrated by a single lens for simplicity. It should be noted that in practice, each lens group may include a different kind and different number of lenses to satisfy system requirements. In the operation, the objective lens or lens group 35 gathers incident light and the ocular lens or lens group 36 magnifies the image formed by the micromirror array reflector 34. The binoculars 31 of the present invention further comprise at least one viewer focus adjustment means 43 as will be shown in FIGS. 4A-4B. The viewer can generate a command signal using the viewer focus adjustment means 43 so that the optical surface profile of the micromirror array reflector 34 is changed to change its focal length until the focused image is obtained. Two optical units 32 can be focused simultaneously for simplicity. Also, the optical units 32 can be focused independently for the corresponding eyes.

Unlike the conventional binoculars 11 having macroscopic mechanical lens movement as shown in FIGS. 1A-1B, the binoculars 31 of the present invention change the optical surface profiles of the micromirror array reflectors 34 to perform focusing function. Therefore, the distance between the objective lens or lens group 35 and ocular lens or lens group 36 in the binoculars 31 of the present invention is fixed.

Figure 4A:
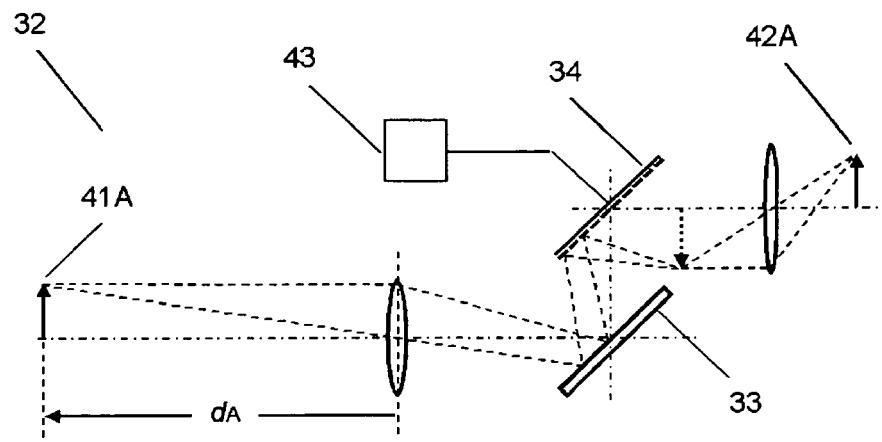
FIGS. 4A-4B are schematic diagrams showing how focusing function is performed in the binoculars of the present invention.
Figure 4B:
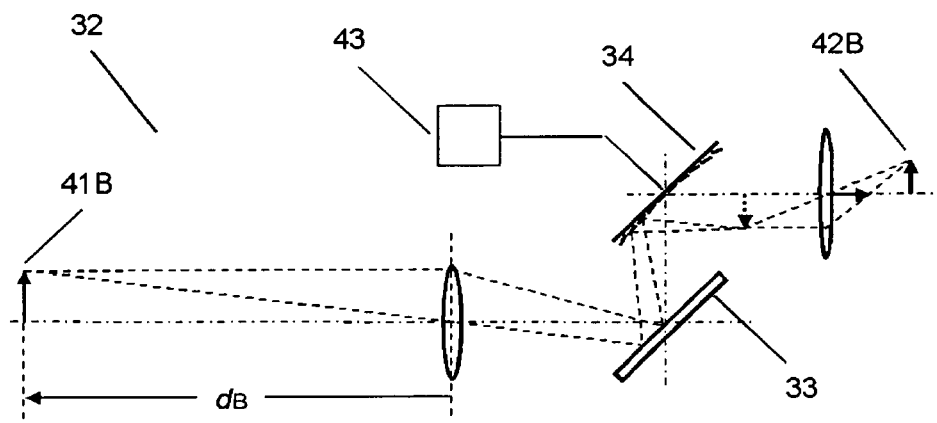

FIGS. 4A-4B are schematic diagrams showing how focusing function is performed in the binoculars of FIG. 3. Although the binoculars 31 comprise two optical units 32, the configuration and operation of the binoculars 31 is illustrated for only one optical unit 32 for simplicity. When different objects 41A, 41B are observed or an object 41A, 41B is moving, the object distance $d_A$, $d_B$ is changed. Therefore, the optical unit 32 has to be refocused so that the viewer can see a focused image. In the optical unit 32 of the present invention, the refocusing is done by changing the optical surface profile of the micromirror array reflector 34. In FIG. 4A, the viewer sees the focused image 42A of the object 41A located at the object distance $d_A$. When the viewer views the object 41B located at the different object distance $d_B$ through the optical unit 32 with the micromirror array reflector 34 having the same optical surface profile as that of the FIG. 4A, the viewer will see the defocused image of the object 41B. Then, the viewer generates a command signal by adjusting the viewer focus adjustment means 43 until the focused image 42B of the object 41B is obtained, wherein the optical surface profiles of the micromirror array reflector 34 is changed according to the command signal. The required optical surface profiles of the micromirror array reflector 34 are predetermined to provide required optical properties such as required focal lengths in accordance with the object distances $d_A$, $d_B$.

The binoculars 31 with the micromirror array reflectors of the present invention can provide high quality images for all the object distances $d_A$, $d_B$ by correcting possible optical aberration in each object distance $d_A$, $d_B$ without introducing additional lens elements for aberration correction. The optical surface profiles of the micromirror array reflectors 32 at each object distance $d_A$, $d_B$ can be optimized to remove or reduce the optical aberration. Since the binoculars 31 of the present invention do not involve with any macroscopic mechanical lens movement, they can be built in a simple and compact structure with low cost while providing high quality image.

Referring back to FIG. 3, it shows only one case among many possible embodiments, wherein the micromirror array reflectors are used to perform focusing function. Any embodiment that at least one of reflector elements is a micromirror array reflector can have focusing function. In one embodiment of the binoculars with micromirror array reflector having focusing function, the first reflector element is a micromirror array reflector and the second reflector element is a mirror. In another embodiment of the binoculars with micromirror array reflector having focusing function, both first and second reflector elements are micromirror array reflectors.

Zoom function can be performed if at least one of reflector elements in each optical unit is a micromirror array reflector. FIGS. 5-18 show various embodiments of the zoom binoculars with micromirror array reflectors.

Figure 5:
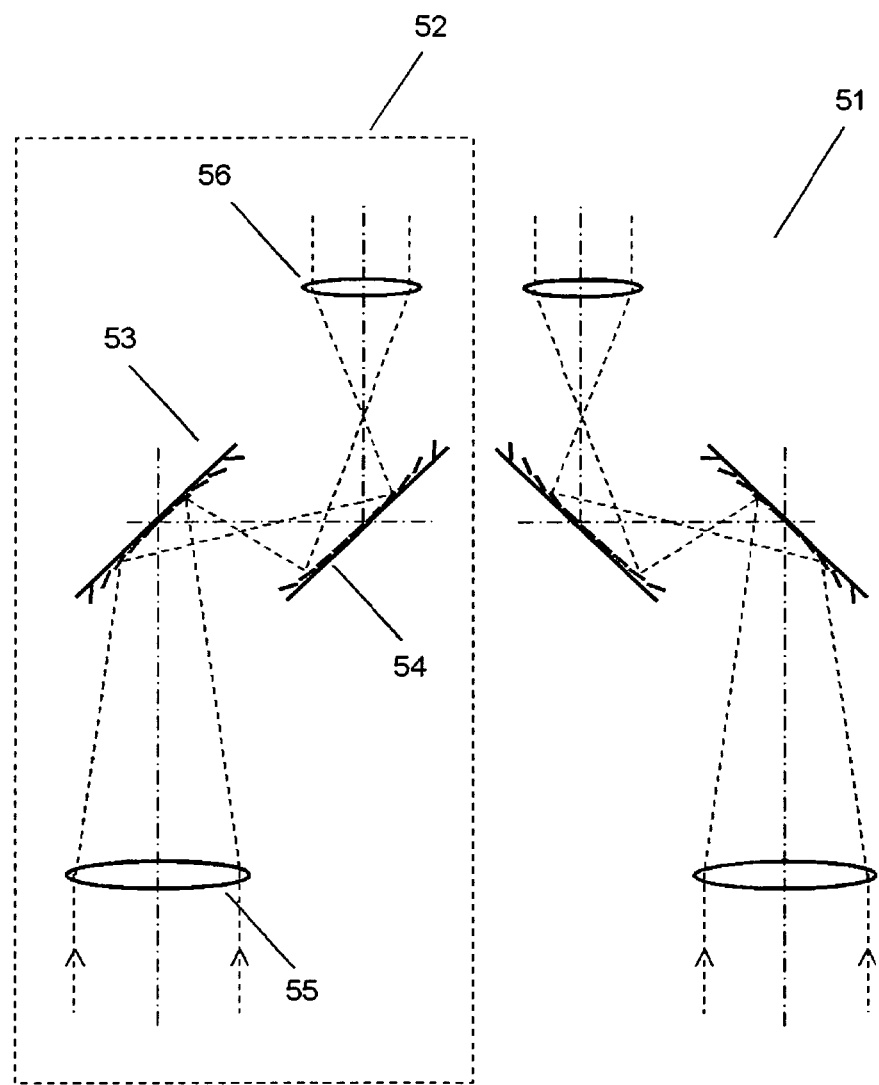
FIG. 5 is a schematic diagram of one embodiment of zoom binoculars with micromirror array reflectors, wherein the binoculars have zoom function without macroscopic mechanical lens movement.

FIG. 5 is a schematic diagram of one embodiment of zoom binoculars with micromirror array reflectors, wherein the zoom binoculars 51 have zoom function without macroscopic mechanical lens movement. In each optical unit 52 of the binoculars 51, the first reflector elements is a first micromirror array reflector 53 and the second reflector element is a second micromirror array reflector 54. The first micromirror array reflector 53 is a variator to change the magnification of the optical unit 52 by changing its optical surface profile. The second micromirror array reflector 54 is a compensator to maintain the focus of the optical unit 52 throughout a zoom range by changing its optical surface profile. The both micromirror array reflectors 53, 54 have a variable optical property by forming a plurality of optical surface profiles. Each optical surface profile is predetermined for each micromirror array reflector 53, 54 to have a required optical property such as a required focal length. Each optical unit 52 may further comprise an objective lens or lens group 55 and disposed to the object side. Also, each optical unit 52 may further comprise an ocular lens or lens group 56 disposed to the eye side. In the operation, the objective lens or lens group 55 gathers incident light and the ocular lens or lens group 56 magnifies the image formed by the second micromirror array reflector 54.

Figure 6A:
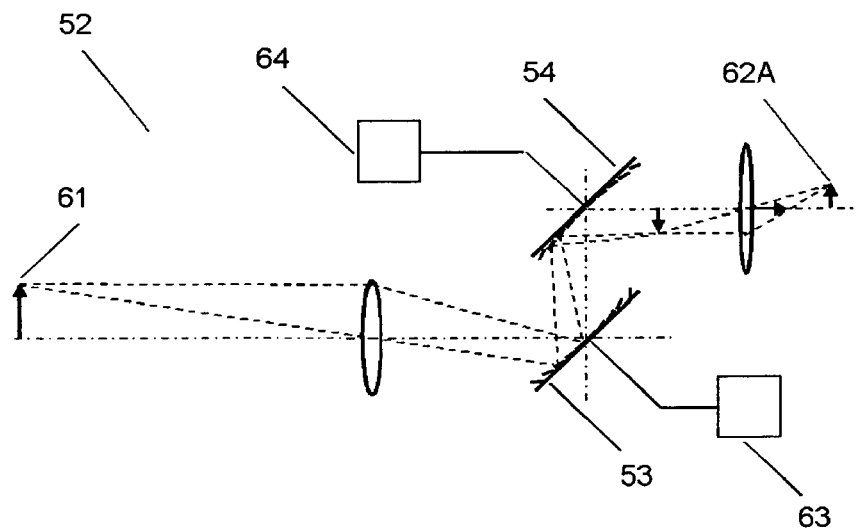
FIGS. 6A-6B are a schematic diagram showing how zoom function are performed in the zoom binoculars of the present invention.
Figure 6B:
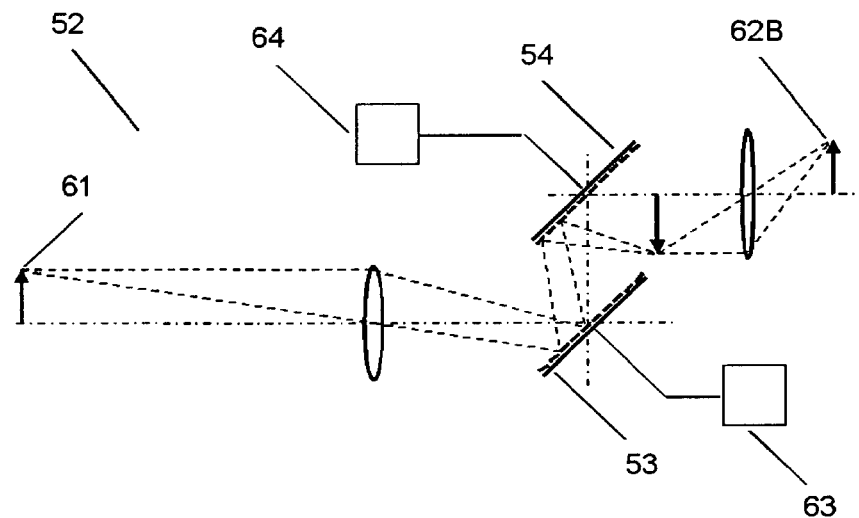

The zoom binoculars 51 of the present invention can further comprise at least one viewer magnification adjustment means 63 as will be shown in FIGS. 6A-6B. The viewer can generate a command signal by using the viewer magnification adjustment means 63 so that the optical surface profile of the micromirror array reflector 53 is changed until the desired magnification of the optical unit 52 is obtained. The magnifications of two optical units 52 can be changed simultaneously by a single viewer magnification adjustment means 63 for simplicity and convenience. On the other hand, the magnification of each optical unit 52 can be changed independently for the corresponding eye. To obtain the focused image, the operation of the micromirror array reflector 53 can be synchronized with the operation of the micromirror array reflector 54, wherein the optical surface profiles of the micromirror array reflector 54 are predetermined in accordance with the magnification of the optical unit 52 and the object distance. In this case, the micromirror array reflector 54 is configured to change its optical surface profile automatically to maintain the focus of the optical unit 52 as the optical surface profile of the micromirror array reflector 53 is changed. Alternatively, the binoculars 51 of the present invention can further comprise at least one viewer focus adjustment means 64 as will be shown in FIGS. 6A-6B. The focus of the optical unit 52 is maintained by the viewer using the viewer focus adjustment means 64, wherein the viewer can generate a command signal with the viewer focus adjustment means 64 to change the optical surface profile of the micromirror array reflector 54 until the focused image is obtained.

Unlike the conventional zoom binoculars having macroscopic mechanical lens movement as shown in FIG. 2, the zoom binoculars 51 of the present embodiment change the optical surface profiles of the micromirror array reflectors 53, 54 to perform zooming function. Therefore, fixed are the positions of the optical elements 53, 54, 55, 56 in the zoom binoculars 51 of the present embodiment.

FIGS. 6A-6B are schematic diagrams showing how zoom function is performed in the zoom binoculars 51 of FIG. 5. Although the zoom binoculars 51 comprise two optical units 52, the configuration and operation of the zoom binoculars 51 is illustrated for only one optical unit 52 for simplicity. In FIG. 6A, the first micromirror array reflector 53 and the second micromirror array reflector 54 are positioned such that an object 61 is focused at one magnification, wherein a viewer can see the focused image 62A of the object 61 through the zoom binoculars 51. Using a viewer magnification adjustment means 63, the viewer can change the magnification of the optical unit 52, wherein the optical property such as focal length of the first micromirror array reflector 53 is changed by changing its optical surface profile in order to change the magnification of the optical unit 52. When the magnification of the optical unit 52 is changed, the image is defocused because the position of an image plane is also changed. The micromirror array reflector 54 can be configured to change its optical surface profile automatically to maintain the focus of the optical unit 52 as the micromirror array reflector 53 is changed, wherein the optical surface profiles of the micromirror array reflector 54 are predetermined in accordance with the magnification of the optical unit 52 and the object distance. FIG. 6B shows the focused image 62B of the object 61 after magnification change. Alternatively, the optical surface profile of the second micromirror array reflector 54 is changed by the viewer using the viewer focus adjustment means 64 in order to maintain the focus of the optical unit 52.

Referring back to FIG. 5, the zoom binoculars 51 of the present embodiment can provide a plurality of magnifications. For each magnification, the required optical surface profile of the first micromirror array reflector 53 is predetermined. Therefore, the motions of the micromirrors of the first micromirror array reflector 53 for each magnification are predetermined as well. When the viewer chooses a desired magnification using the viewer magnification adjustment means, the first micromirror array reflector 53 forms the predetermined optical surface profile corresponding to the desired magnification by controlling the micromirrors to have predetermined motions. To maintain the focus of the optical unit 52 at a given magnification, the second micromirror array reflector 54 can have a plurality of predetermined optical surface profiles depending on the object distance. Since the micromirror array reflectors 53, 54 can reproduce virtually any reflective optical surfaces, the optical surface profiles of the micromirror array reflectors 53, 54 at each magnification and each object distance can be optimized to remove or reduce any possible optical aberration. Therefore, the zoom binoculars 51 of the present embodiment can provide high quality images for all possible magnifications without introducing additional lens elements. Also, since the zoom binoculars 51 of the present embodiment do not involve with any macroscopic mechanical lens movement, they can be built in a simple and compact structure with low cost while providing high quality image.

Although FIGS. 5 and 6 show how zoom function is performed by using one example that the first micromirror array reflector 53 works as a variator and the second micromirror array reflector 54 works as a compensator, the one skilled in the art will understands that the first micromirror array reflector 53 and the second micromirror array reflector 54 can work as a compensator and a variator, respectively to perform zoom function. Also, the one skilled in the art will understands that both first and the second micromirror array reflectors 53, 54 can be used to change the magnification and maintain the focus of the optical unit 52 together.

Figure 7:
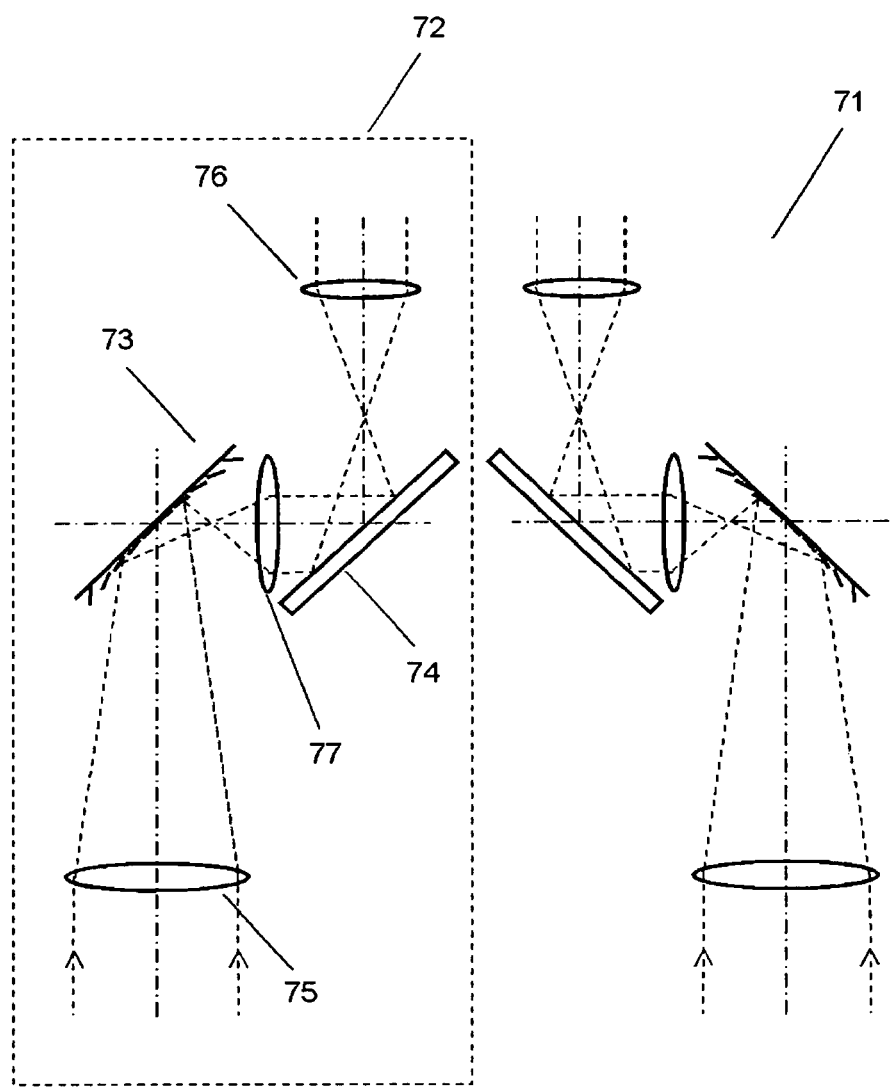
FIG. 7 is a schematic diagram showing one embodiment of pan focus zoom binoculars with micromirror array reflectors.

The binoculars of the present invention can provide zoom function using one micromirror array reflector in each optical unit, wherein in each optical unit, the one reflector element is a micromirror array reflector and the other reflector element is a mirror. This embodiment is desirable for zoom binoculars having a long depth of focus, wherein the compensator is not required. Smaller aperture and longer focal length, longer depth of focus. FIG. 7 is a schematic diagram showing one embodiment of pan focus zoom binoculars 71 with micromirror array reflectors. In each optical unit 72, the first reflector element is a micromirror array reflector 73 and the second reflector element is a mirror 74. Each optical unit 72 may further comprise an objective lens or lens group 75 disposed to the object side. Also, each optical unit 72 may further comprise an ocular lens or lens group 76 disposed to the eye side. In the operation, the objective lens or lens group 75 gathers incident light and the ocular lens or lens group 76 magnifies the image formed by the mirror 74. Each optical unit 72 may further comprise an erect reflector or reflector group 77 in order to obtain an upright image.

The operation of the pan focus zoom binoculars of the present embodiment is similar to that of the zoom binoculars of FIG. 5 except the fact that this embodiment does not require a compensator. The pan focus zoom binoculars 71 of the present embodiment can provide a plurality of magnifications. For each magnification, the required optical surface profile of the micromirror array reflector 73 is predetermined. Therefore, the motions of the micromirrors of the micromirror array reflector 73 for each magnification are predetermined as well. The zoom binoculars 71 of the present invention can further comprise at least one viewer magnification adjustment means (not shown) as shown in FIGS. 6A-6B. The viewer can generate a command signal by using the viewer magnification adjustment means so that the optical surface profile of the micromirror array reflector 73 is changed until the desired magnification of the optical unit 72 is obtained. Since the pan focus zoom binoculars 71 have a long depth of field, the image will be focused in the acceptable level throughout a whole zoom range without the compensator. The optical surface profile of the micromirror array reflectors 73 at each magnification can be optimized to remove or reduce any possible optical aberration. This embodiment can be advantageously used for low cost, small zoom binoculars having a long depth of focus.

Although FIG. 7 shows one embodiment of the pan focus zoom binoculars, wherein the first reflector element is a micromirror array reflector 73 and the second reflector element is a mirror, the one skilled in the art will understands that pan focus zoom function can be performed in the case that the first reflector element is a mirror and the second reflector element is a micromirror array reflector, as well.

The zoom binoculars of the present invention can uses conventional lens elements in addition to micromirror array reflectors. The conventional lens elements include movable lenses and variable focus lenses. The movable lenses have macroscopic mechanical lens movement. The variable focus lens can change its focal length without macroscopic mechanical lens movement. The variable focus lens can be a non-micromirror array type lens such as a liquid crystal lens. FIGS. 8-11 show possible embodiments of the zoom binoculars using the conventional lens elements. In each optical unit of these embodiments, one reflector element is a micromirror array reflector and the other reflector element is a mirror. Each optical unit may further comprise an objective lens or lens group and disposed to the object side. Also, each optical unit may further comprise an ocular lens or lens group disposed to the eye side. At least one lens element of the objective lens or lens group or the ocular lens or lens group is a conventional lens element. In some embodiments, the micromirror array reflector is a variator to change the magnification of the optical unit and the conventional lens element is a compensator to maintain the focus of the optical unit, and in other embodiments, vice versa.

Figure 8:
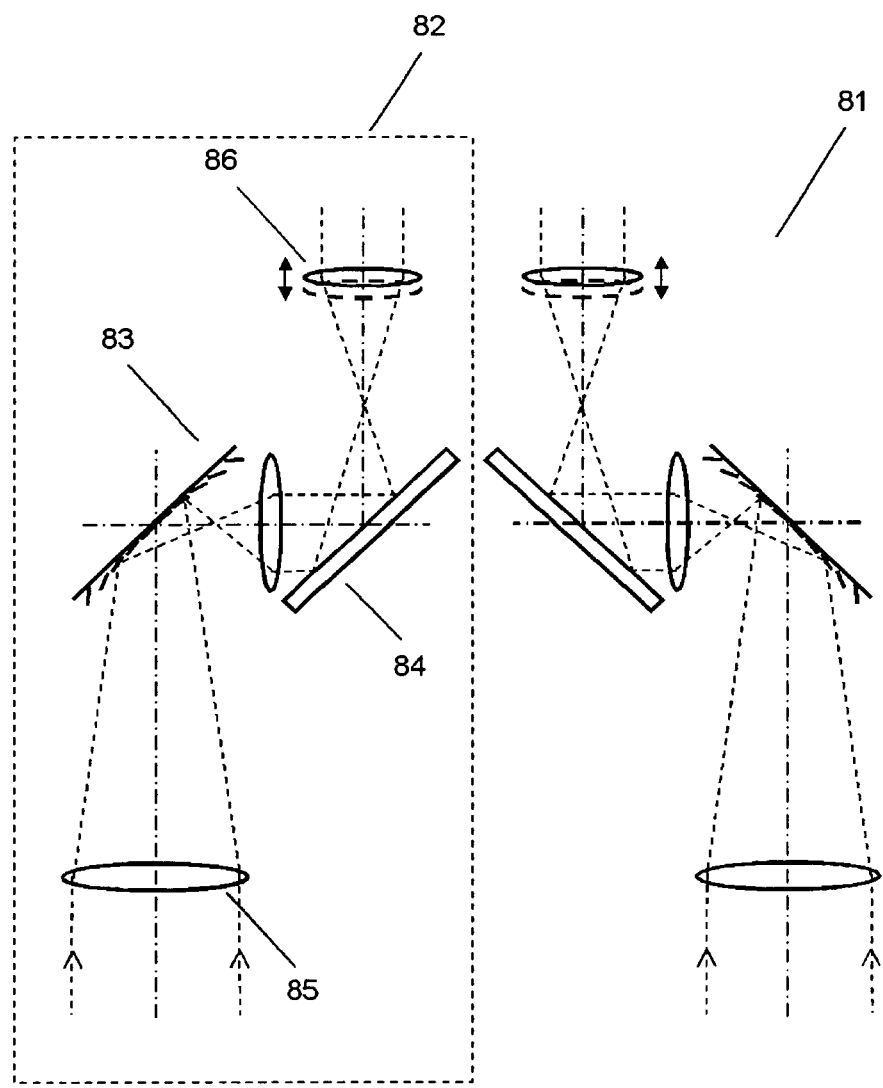
FIG. 8 is a schematic diagram of zoom binoculars with micromirror array reflectors using movable lenses, wherein each ocular lens group comprises at least one movable lens.
Figure 9:
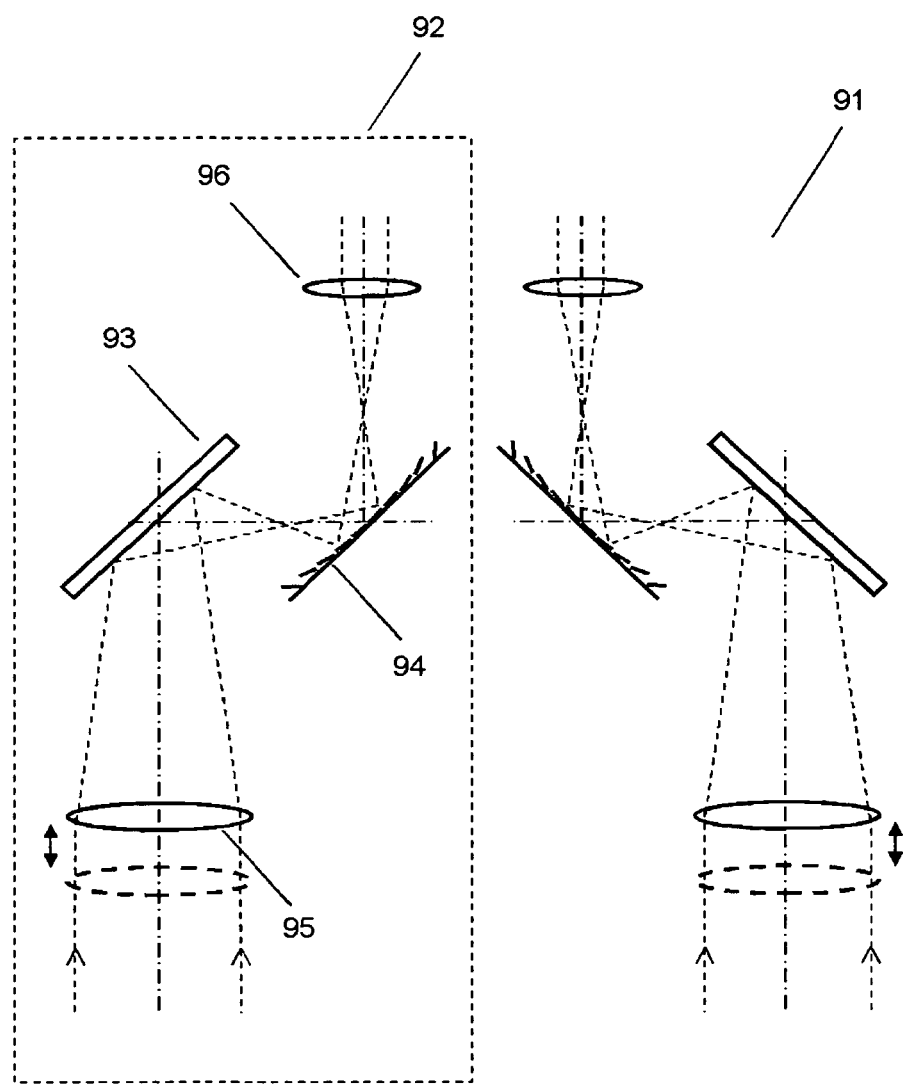
FIG. 9 is a schematic diagram of zoom binoculars with micromirror array reflectors using movable lenses, wherein each objective lens group comprises at least one movable lens.

FIGS. 8 and 9 show the embodiments of zoom binoculars with micromirror array reflector using movable lenses. The movable have macroscopic mechanical lens movement. The positions of the movable lenses are adjusted manually or electrically using the viewer adjustment means such as a set of buttons, wheel, dial, slider, touch screen, a zoom ring on the lens barrel, and so on. FIG. 8 is a schematic diagram of zoom binoculars 81 with micromirror array reflectors using movable lenses, wherein each ocular lens group comprises at least one movable lens. In each optical unit 82, the first reflector element is a micromirror array reflector 83 working as a variator configured to change the magnification of the optical unit 82 by changing its optical surface profile, the second reflector element is a mirror 84, and the ocular lens group comprises at least one movable lens 86 working as a compensator configured to maintain the focus of the optical unit 82 by changing its position. The zoom binoculars 81 of the present invention can further comprise at least one viewer magnification adjustment means (not shown) as shown in FIGS. 6A-6B. The viewer can generate a command signal by using the viewer magnification adjustment means so that the optical surface profile of the micromirror array reflector 83 is changed until the desired magnification of the optical unit 82 is obtained. The movable lens 86 can be configured to move automatically based on the magnification of the optical unit 82 and the object distance to obtain a focused image. Alternatively, the movable lens 86 can be configured to be moved by the viewer manually until the focused image is obtained. In this case, the binoculars 81 can include at least one viewer focus adjustment means. Each optical unit 82 may further comprise an objective lens or lens group 85 disposed to the object side.

Although FIG. 8 shows only one embodiment of the zoom binoculars with micromirror array reflectors using movable lenses, wherein the first reflector element is a micromirror array reflector and the ocular lens group comprises at least one movable lens, the one skilled in art will understand that many variations are possible for the zoom binoculars with micromirror array reflectors using movable lenses. In one embodiment, the first reflector element is a micromirror array reflector working as a compensator and the ocular lens group comprises at least one movable lens working as a variator. In another embodiment, the second reflector element is a micromirror array reflector working as a variator and the ocular lens group comprises at least one movable lens working as a compensator. In still another embodiment, the second reflector element is a micromirror array reflector working as a compensator and the ocular lens group comprises at least one movable lens working as a variator.

FIG. 9 is a schematic diagram of the zoom binoculars 91 with micromirror array reflectors using movable lenses, wherein each objective lens group comprises at least one movable lens. In each optical unit 92, the first reflector element is a mirror 93, the second reflector element is a micromirror array reflector 94 working as a compensator configured to maintain the focus of the optical unit 92 by changing its optical surface profile, and the objective lens group comprises at least one movable lens 95 working as a variator configured to change the magnification of the optical unit 92 by changing its position. The binoculars 91 further comprise at least one viewer magnification adjustment means (not shown), wherein the viewer adjusts the position of the movable lens 95 using the viewer magnification adjustment means. The micromirror array reflector 94 can be configured to change its optical surface profile automatically based on the magnification of the optical unit 92 and the object distance. Alternatively, the optical surface profile of the micromirror array reflector 94 can be changed by the viewer using at least one viewer focus adjustment means until the focused image is obtained. Each optical unit 92 may further comprise an ocular lens or lens group 96 disposed to the eye side.

Although FIG. 9 shows only one embodiment of the zoom binoculars with micromirror array reflectors using movable lenses, wherein the second reflector element is a micromirror array reflector and the objective lens group comprises at least one movable lens, the one skilled in art will understand that many variations are possible for the zoom binoculars with micromirror array reflectors using movable lenses. In one embodiment, the second reflector element is a micromirror array reflector working as a variator and the objective lens group comprises at least one movable lens working as a compensator. In another embodiment, the first reflector element is a micromirror array reflector working as a compensator and the objective lens group comprises at least one movable lens working as a variator. In still another embodiment, the first reflector element is a micromirror array reflector working as a variator and the objective lens group comprises at least one movable lens working as a compensator.

Figure 10:
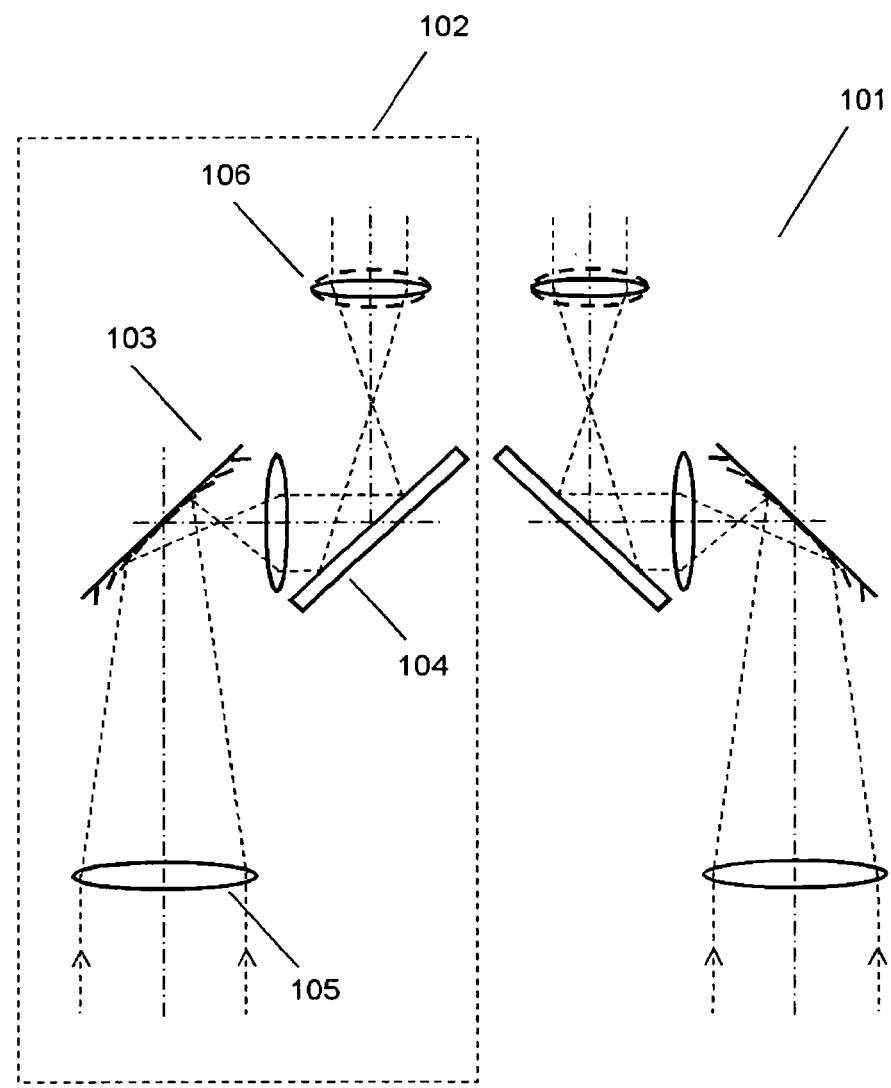
FIG. 10 is a schematic diagram of zoom binoculars with micromirror array reflectors using variable focus lenses, wherein each ocular lens group comprises at least one variable focus lens.
Figure 11:
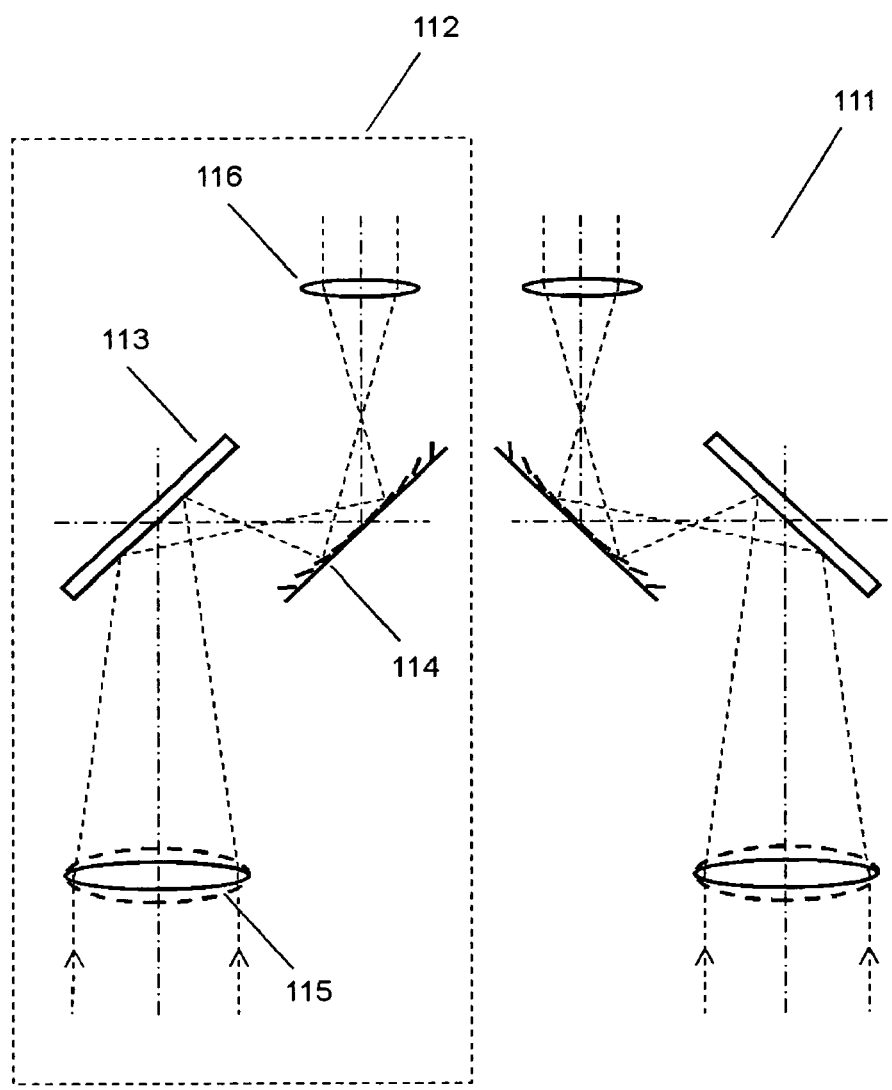
FIG. 11 is a schematic diagram of zoom binoculars with micromirror array reflectors using variable focus lenses, wherein each objective lens group comprises at least one variable focus lens.

FIGS. 10 and 11 show the embodiments of zoom binoculars with micromirror array reflector using variable focus lenses. The focal length of the variable focus lens can be changed without macroscopic mechanical lens movement. The variable focus lens can be a non-micromirror array reflector type lens such as a liquid crystal lens, wherein the focal length of the liquid crystal can be changed by altering its refractive index. The focal length of the variable focus lens is adjusted electrically using the viewer adjustment means such as a set of buttons, a wheel, a dial, a slider, a touch screen, and so on. FIG. 10 is a schematic diagram of zoom binoculars 101 with micromirror array reflectors using variable focus lenses, wherein each ocular lens group comprises at least one variable focus lens. In each optical unit 102, the first reflector element is a micromirror array reflector 103 working as a variator configured to change the magnification of the optical unit 102 by changing its optical surface profile, the second reflector element is a mirror 104, and the ocular lens group comprises at least one variable focus lens 106 working as a compensator configured to maintain the focus of the optical unit 102 by changing its focal length. The zoom binoculars 101 of the present invention can further comprise at least one viewer magnification adjustment means (not shown) as shown in FIGS. 6A-6B. The viewer can generate a command signal by using the viewer magnification adjustment means so that the optical surface profile of the micromirror array reflector 103 is changed until the desired magnification of the optical unit 102 is obtained. The variable focus lens 106 can be configured to change its focal length automatically in accordance with the magnification of the optical unit 102 and the object distance to obtain a focused image. Alternatively, the focal length of the variable focus lens 106 can be changed by the viewer using at least one viewer focus adjustment means until the focused image is obtained. Each optical unit 102 may further comprise an objective lens or lens group 105 disposed to the object side.

Although FIG. 10 shows only one embodiment of the zoom binoculars with micromirror array reflectors using variable focus lenses, wherein the first reflector element is a micromirror array reflector and the ocular lens group comprises at least one variable focus lens, the one skilled in art will understand that many variations are possible for the zoom binoculars with micromirror array reflectors using variable focus lenses. In one embodiment, the first reflector element is a micromirror array reflector working as a compensator and the ocular lens group comprises at least one variable focus lens working as a variator. In another embodiment, the second reflector element is a micromirror array reflector working as a variator and the ocular lens group comprises at least one variable focus lens working as a compensator. In still another embodiment, the second reflector element is a micromirror array reflector working as a compensator and the ocular lens group comprises at least one variable focus lens as a variator.

FIG. 11 is a schematic diagram of zoom binoculars 111 with micromirror array reflectors using variable focus lenses, wherein each objective lens group comprises at least one variable focus lens. In each optical unit 112, the first reflector element is a mirror 113, the second reflector element is a micromirror array reflector 114 working as a compensator configured to maintain the focus of the optical unit 112 by changing its optical surface profile, and the objective lens group comprises at least one variable focus lens 115 working as a variator configured to change the magnification of the optical unit 112 by changing its focal length. The binoculars 111 further comprise at least one viewer magnification adjustment means (not shown), wherein the focal length of the variable focus lens 115 is adjusted electrically using the viewer magnification adjustment means. The micromirror array reflector 114 can be configured to change its optical surface profile automatically based on the magnification of the optical unit 112 and the object distance. Alternatively, the optical surface profile of the micromirror array reflector 114 can be changed by the viewer using at least one viewer focus adjustment means until the focused image is obtained. Each optical unit 112 may further comprise an ocular lens or lens group 116 disposed to the eye side.

Although FIG. 11 shows only one embodiment of the zoom binoculars with micromirror array reflectors using variable focus lenses, wherein the second reflector element is a micromirror array reflector and the objective lens group comprises at least one variable focus lens, the one skilled in art will understand that many variations are possible for the zoom binoculars with micromirror array reflectors using variable focus lenses. In one embodiment, the second reflector element is a micromirror array reflector working as a variator and the objective lens group comprises at least one variable focus lens working as a compensator. In another embodiment, the first reflector element is a micromirror array reflector working as a compensator and the objective lens group comprises at least one variable focus lens working as a variator. In still another embodiment, the first reflector element is a micromirror array reflector working as a variator and the objective lens group comprises at least one variable focus lens working as a compensator.

Figure 12:
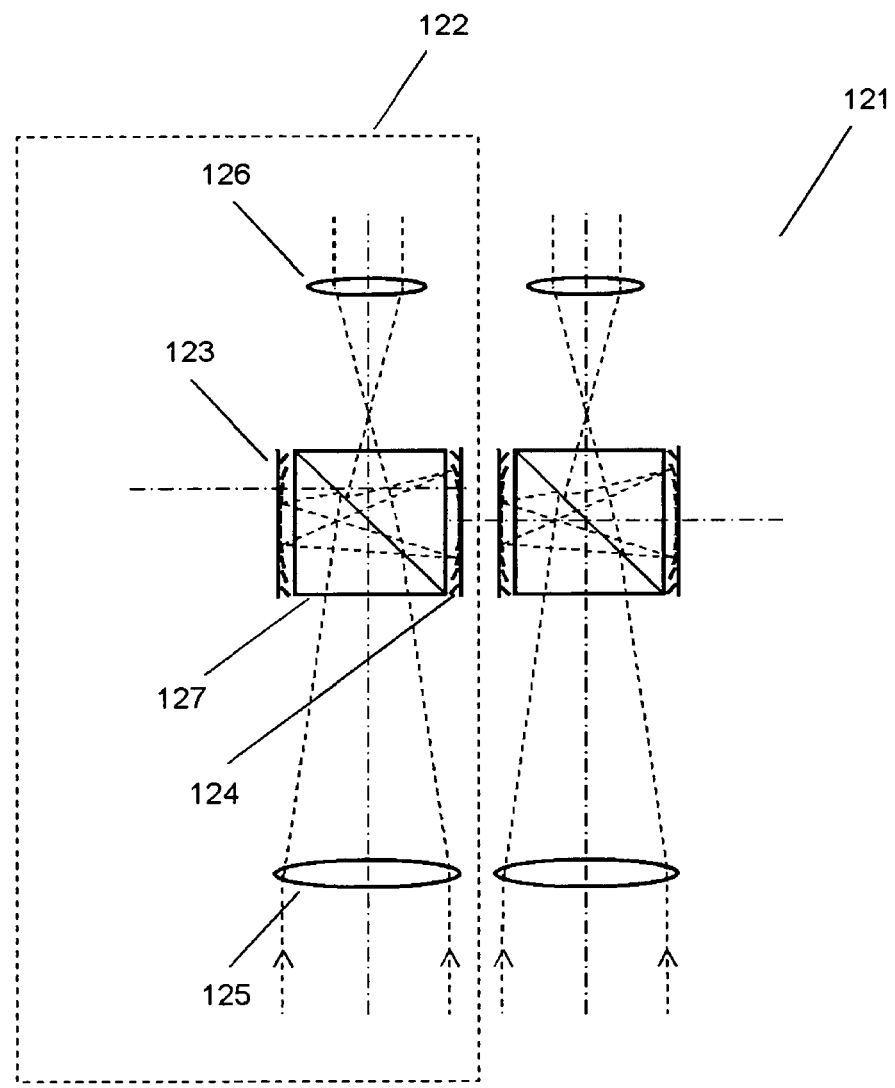
FIG. 12 is a schematic diagram of binoculars with micromirror array reflectors using beam splitters.

The binoculars with micromirror array reflectors in FIGS. 3-11 can further comprise beam splitters in order to provide a compact structure. FIG. 12 is a schematic diagram of the binoculars 121 with micromirror array reflectors using beam splitters. Each optical unit 122 comprises a first reflector element 123 and a second reflector element 124. Each optical unit 122 can further comprise an objective lens or lens group 125 and an ocular lens or lens group 126. A beam splitter 127 is disposed between the first reflector element 123 and the second reflector element 124. The beam splitter 127 reflects light from the objective side to the first reflector element 123, the first reflector element 123 reflects the light reflected from the beam splitter 127 to the second reflector element 124, the second reflector element 124 reflects the light reflected from the first reflector element 123 to the beam splitter 127, and the beam splitter 127 reflects the light reflected from the second reflector element 124 to the eye side. The use of the beam splitter 127 allows the binoculars 121 to have a compact structure, which can increase the portability of the binoculars.

Although the binocular 121 with micromirror array reflectors in FIG. 12 shows one case among many possible embodiments of the binoculars with micromirror array reflectors using beam splitters, the one skilled in art will understand that the beam splitters can be used for all the embodiments disclosed in FIGS. 3-11 in the similar way.

The binoculars of the present invention can use telescope type configurations to provide zoom and/or focusing functions, wherein the telescope type configurations includes Cassegrainian telescope type configuration and Gregorian telescope type configuration. Conventional reflective telescopes typically comprise a primary mirror and a secondary mirror. These mirrors have a curved or flat surface with a fixed focal length. The primary mirror gathers light and reflects the light to a secondary mirror and the secondary mirror reflects the light to a focal plane. In the conventional telescopes, the magnification is changed by changing eyepieces. In the binoculars with micromirror array reflectors of present invention, each optical unit can use a telescope configuration advantageously since the telescope configuration allows the binoculars to have a compact structure. The micromirror array reflector can reproduce various reflective optical surfaces used in conventional reflective telescopes. The optical surface profile of the micromirror array reflector satisfies a convergence condition and a phase matching condition to reproduce a flat mirror. The optical surface profile of the micromirror array reflector satisfies a convergence condition and a phase matching condition to reproduce a parabolic concave mirror. The optical surface profile of the micromirror array reflector satisfies a convergence condition and a phase matching condition to reproduce a spherical concave mirror. The optical surface profile of the micromirror array reflector satisfies a convergence condition and a phase matching condition to reproduce a hyperbolic concave mirror. The optical surface profile of the micromirror array reflector satisfies a convergence condition and a phase matching condition to reproduce an elliptic concave mirror. The optical surface profile of the micromirror array reflector satisfies a convergence condition and a phase matching condition to reproduce a parabolic convex mirror. The optical surface profile of the micromirror array reflector satisfies a convergence condition and a phase matching condition to reproduce a spherical convex mirror. The optical surface profile of the micromirror array reflector satisfies a convergence condition and a phase matching condition to reproduce a hyperbolic convex mirror. The optical surface profile of the micromirror array reflector satisfies a convergence condition and a phase matching condition to reproduce an elliptic convex mirror. The optical surface profile of the micromirror array reflector satisfies a convergence condition and a phase matching condition to reproduce any aberration corrected mirror.

The telescope type binoculars with micromirror array reflectors can provide focusing and/or zoom functions without or with minimal macroscopic mechanical mirror movement and without changing eyepieces. In the present invention, the primary mirror is a first reflector element and the secondary mirror is a second reflector element, wherein at least one of the reflector elements is a micromirror array reflector. Although the arrangements of the optical elements of the telescope type binoculars are different from that of the embodiments of FIGS. 3-12, the each optical element has the same function as that of the embodiments of FIGS. 3-12.

Figure 13:
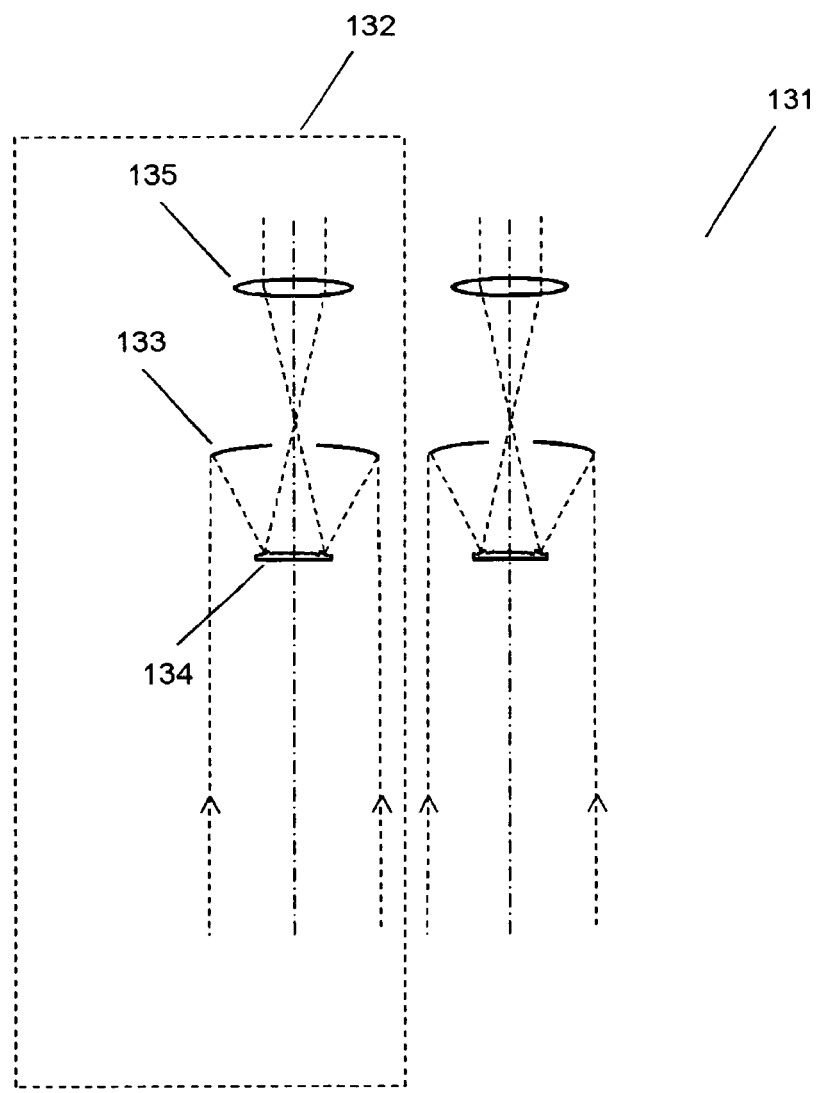
FIG. 13 is a schematic diagram of one embodiment of Cassegrainian telescope type binoculars with micromirror array reflectors, wherein the binoculars have focusing function without macroscopic mechanical lens movement.

FIGS. 13-17 show the exemplary embodiments of telescope type binoculars with micromirror array reflectors using Cassegrainian telescope configuration. The conventional Cassegrain telescope uses a parabolic concave primary mirror and a hyperbolic convex secondary mirror having fixed focal lengths. The primary mirror reflects light to the secondary mirror and the secondary mirror reflects the light back to the focal plane through a hole in the primary mirror. FIG. 13 is a schematic diagram of one embodiment of Cassegrainian telescope type binoculars 131 with micromirror array reflectors, wherein the binoculars have focusing function without macroscopic mechanical mirror movement. Focusing function can be performed if at least one of reflector elements in each optical unit is a micromirror array reflector. As an exemplary embodiment, illustrated is a case of the Cassegrainian telescope type binoculars 131, wherein in each optical unit 132, the first reflector elements is a parabolic concave mirror 133 with a fixed focal length and the second reflector element is a micromirror array reflector 134 configured to change the focus of the optical unit 132 by changing its optical surface profile. The micromirror array reflector 134 forms a plurality of optical surface profiles reproducing hyperbolic convex mirrors or any other mirrors having desired curved surfaces. Each optical unit 132 may further comprise an ocular lens or lens group 135 disposed to the eye side. The Cassegrainian telescope type binoculars 131 of the present invention further comprise at least one viewer focus adjustment means (not shown) as shown in FIGS. 4A-4B. The viewer can generate a command signal using the viewer focus adjustment means so that the optical surface profile of the micromirror array reflector 134 is changed until the focused image is obtained. Two optical units 132 can be focused simultaneously for simplicity. Also, each optical unit 132 can be focused independently for the corresponding eye.

FIG. 13 shows only one case among many possible embodiments, wherein the micromirror array reflectors are used to perform focusing function. Any embodiment that at least one of reflector elements is a micromirror array reflector can have focusing function. For example, Cassegrainian telescope type binoculars can have focusing function when the first reflector element is a micromirror array reflector forming a plurality of optical surface profiles reproducing parabolic concave mirrors and the second reflector element is a hyperbolic convex mirror.

Zoom function can be performed if at least one of reflector elements in each optical unit of the telescope type binoculars is a micromirror array reflector. FIGS. 14-17 show various embodiments of the Cassegrainian telescope type zoom binoculars with micromirror array reflectors.

Figure 14:
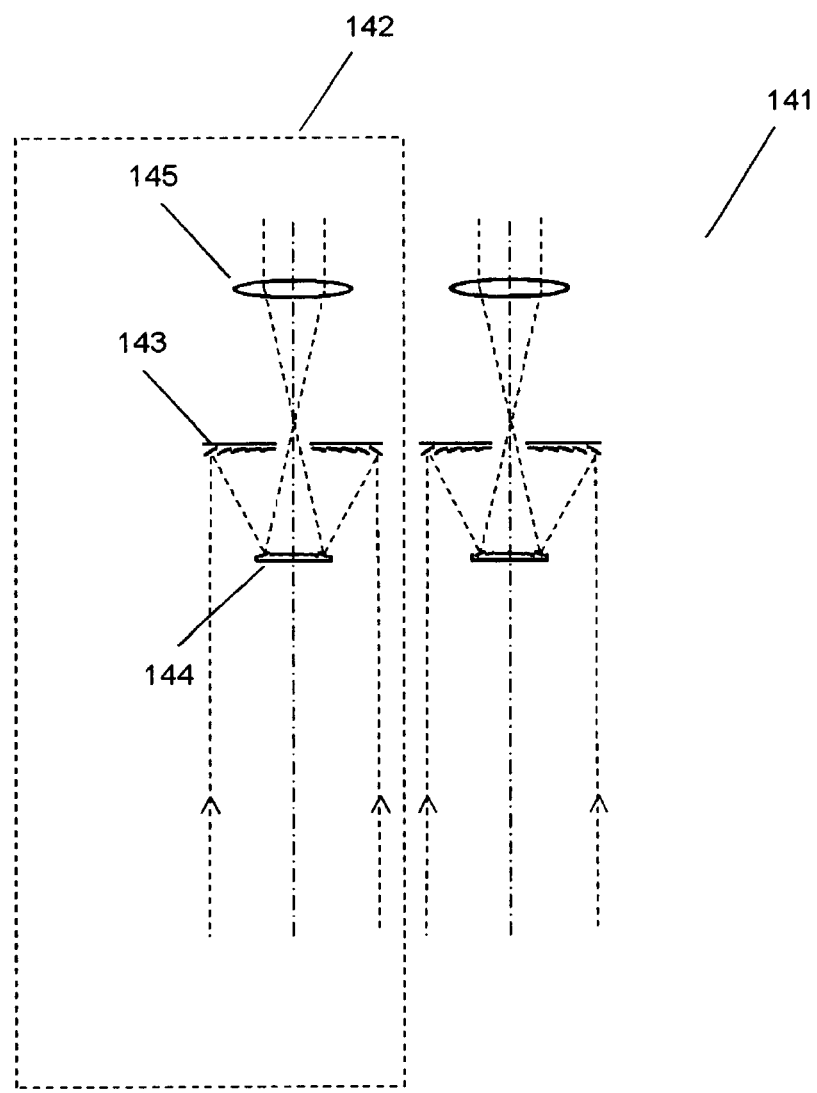
FIG. 14 is a schematic diagram of one embodiment of Cassegrainian telescope type zoom binoculars with micromirror array reflectors, wherein the binoculars have zoom function without macroscopic mechanical lens movement.

FIG. 14 is a schematic diagram of one embodiment of Cassegrainian telescope type zoom binoculars 141 with micromirror array reflectors, wherein the binoculars have zoom function without macroscopic mechanical mirror movement. As an exemplary embodiment, illustrated is a case of the Cassegrainian telescope type zoom binoculars 141, wherein in each optical unit 142, the first reflector elements is a first micromirror array reflector 143 forming a plurality of optical surface profiles reproducing parabolic concave mirrors and the second reflector element is a second micromirror array reflector 144 forming a plurality of optical surface profiles reproducing hyperbolic convex mirrors. Each optical unit 142 may further comprise an ocular lens or lens group 145 disposed to the eye side. The first micromirror array reflector 143 is a variator to change the magnification of the optical unit 142 by changing its optical surface profile. The second micromirror array reflector 144 is a compensator to maintain the focus of the optical unit 142 throughout a zoom range by changing its optical surface profile.

The Cassegrainian telescope type zoom binoculars 141 of the present invention can further comprise at least one viewer magnification adjustment means (not shown) as shown in FIGS. 6A-6B. The viewer can generate a command signal by using the viewer magnification adjustment means so that the optical surface profile of the micromirror array reflector 143 is changed until the desired magnification of the optical unit 142 is obtained. The micromirror array reflector 144 can be configured to change its optical surface profile automatically to maintain the focus of the optical unit 142 as the micromirror array reflector 143 is changed. Alternatively, the optical surface profile of the second micromirror array reflector 144 is changed by the viewer using the viewer focus adjustment means (not shown) in order to maintain the focus of the optical unit 142 until the focused image of the object is obtained.

Although FIG. 14 shows how zoom function is performed by using the example that the first micromirror array reflector 143 works as a variator and the second micromirror array reflector 144 works as a compensator, the one skilled in the art will understands that the first micromirror array reflector 143 and the second micromirror array reflector 144 can work as a compensator and a variator, respectively to perform zoom function. Also, the one skilled in the art will understands that both first and the second micromirror array reflectors 143, 144 can be used to change the magnification and maintain the focus of the optical unit 142 together.

Figure 15:
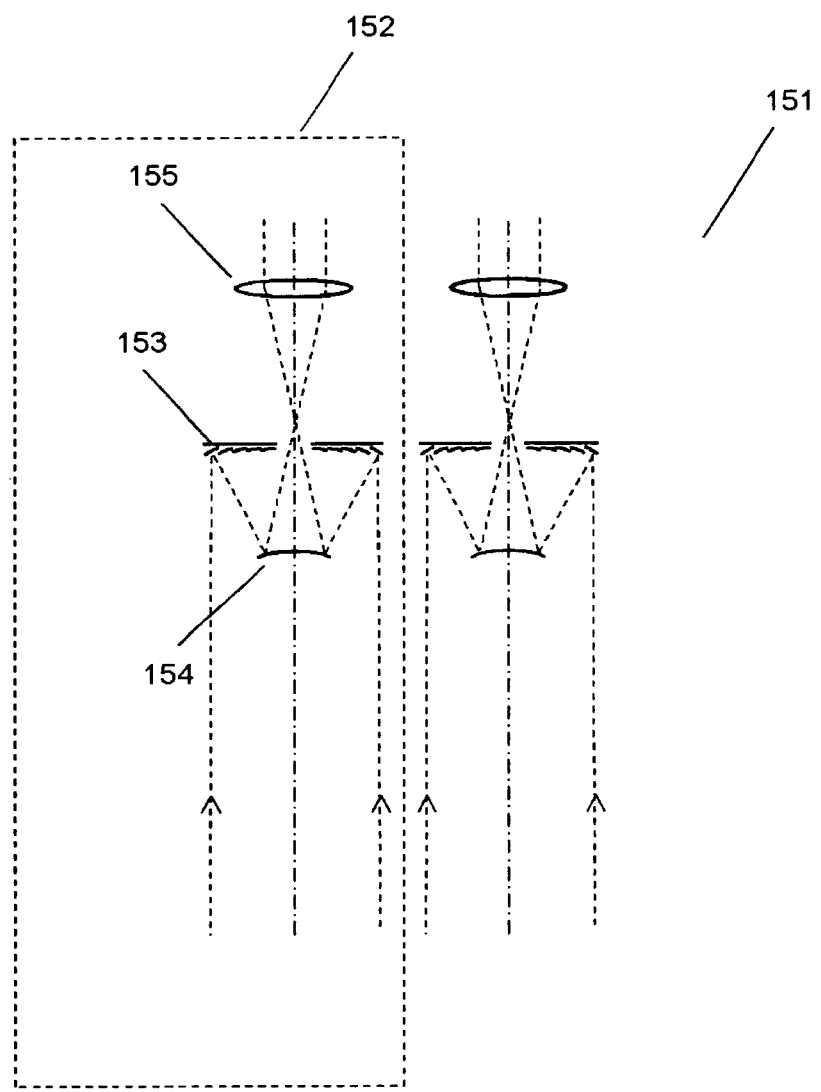
FIG. 15 is a schematic diagram showing one embodiment of pan focus Cassegrainian telescope type zoom binoculars with micromirror array reflectors.

FIG. 15 is a schematic diagram showing one embodiment of pan focus Cassegrainian telescope type zoom binoculars 151 with micromirror array reflectors similar to the embodiment of FIG. 7. In each optical unit 152, the first reflector element is a micromirror array reflector 153 forming a plurality of optical surface profiles reproducing parabolic concave mirrors and the second reflector element is a hyperbolic convex mirror 154. Each optical unit 152 may further comprise an ocular lens or lens group 155 disposed to the eye side. The operation of the pan focus Cassegrainian telescope type zoom binoculars 151 of the present embodiment is similar to that of the zoom binoculars 71 of FIG. 7. This embodiment can be advantageously used for low cost, small zoom binoculars having a long depth of focus.

Although FIG. 15 shows one embodiment of the pan focus Cassegrainian telescope type zoom binoculars, wherein the first reflector element is a micromirror array reflector 153 and the second reflector element is a hyperbolic convex mirror, the one skilled in the art will understands that pan focus Cassegrainian telescope type zoom binoculars can be performed in the case that the first reflector element is a parabolic concave mirror and the second reflector element is a micromirror array reflector forming a plurality of optical surface profiles reproducing hyperbolic convex mirrors, as well.

Figure 16:
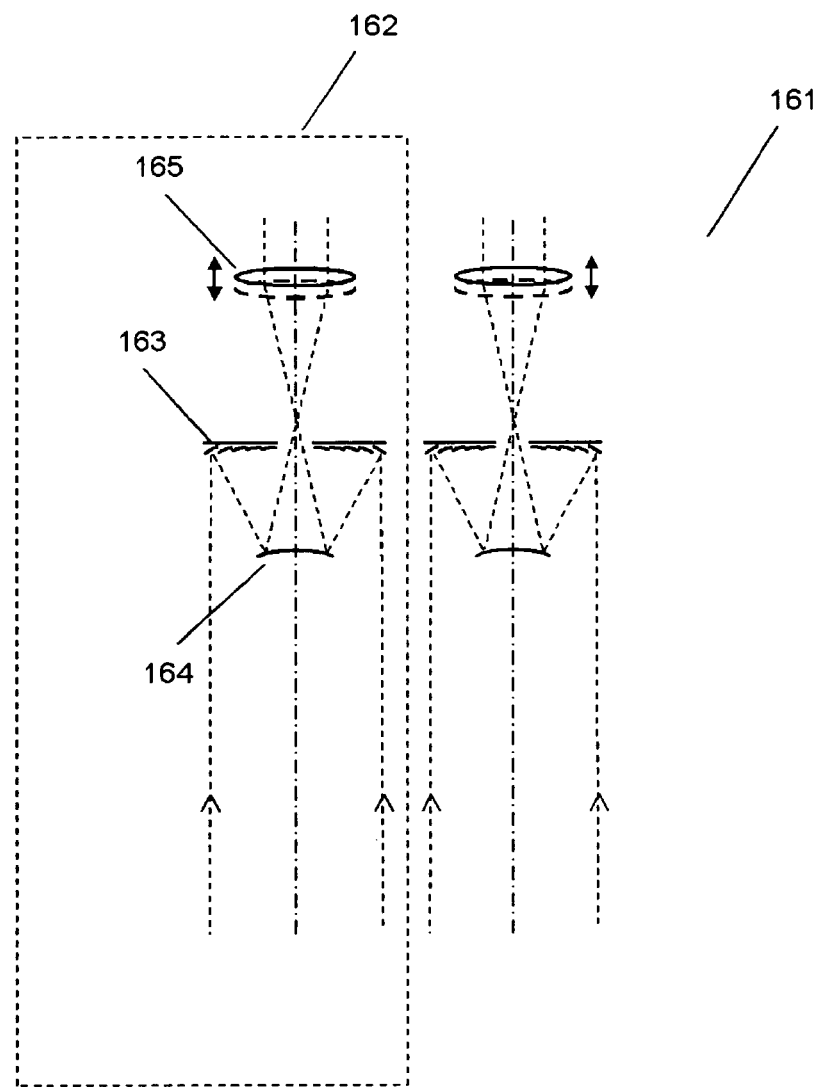
FIG. 16 is a schematic diagram of Cassegrainian telescope type zoom binoculars with micromirror array reflectors using movable lenses, wherein each ocular lens group comprises at least one movable lens.

FIG. 16 is a schematic diagram of Cassegrainian telescope type zoom binoculars 161 with micromirror array reflectors using movable lenses, wherein each ocular lens group includes at least one movable lens similar to the embodiment of FIG. 8. In each optical unit 162, the first reflector element is a micromirror array reflector 163 working as a variator configured to change the magnification of the optical unit by forming a plurality of optical surface profiles reproducing parabolic concave mirrors, the second reflector element is a hyperbolic convex mirror 164, and the ocular lens group comprises at least one movable lens 165 working as a compensator configured to maintain the focus of the optical unit 162 by changing its position.

Although FIG. 16 shows only one embodiment of the Cassegrainian telescope type zoom binoculars with micromirror array reflectors using movable lenses, wherein each ocular lens group comprises at least one movable lens, the one skilled in art will understand that many variations are possible for the Cassegrainian telescope type zoom binoculars with micromirror array reflectors using movable lenses. In one embodiment, the first reflector element is a micromirror array reflector working as a compensator by forming a plurality of optical surface profiles reproducing parabolic concave mirrors, the second reflector element is a hyperbolic convex mirror, and the ocular lens group comprises at least one movable lens working as a variator. In another embodiment, the first reflector element is a parabolic concave mirror, the second reflector element is a micromirror array reflector working as a variator by forming a plurality of optical surface profiles reproducing hyperbolic convex mirrors, and the ocular lens group comprises at least one movable working as a compensator. In still another embodiment, the first reflector element is a parabolic concave mirror, the second reflector element is a micromirror array reflector working as a compensator by forming a plurality of optical surface profiles reproducing hyperbolic convex mirrors, and the ocular lens group comprises at least one movable lens working as a variator.

Figure 17:
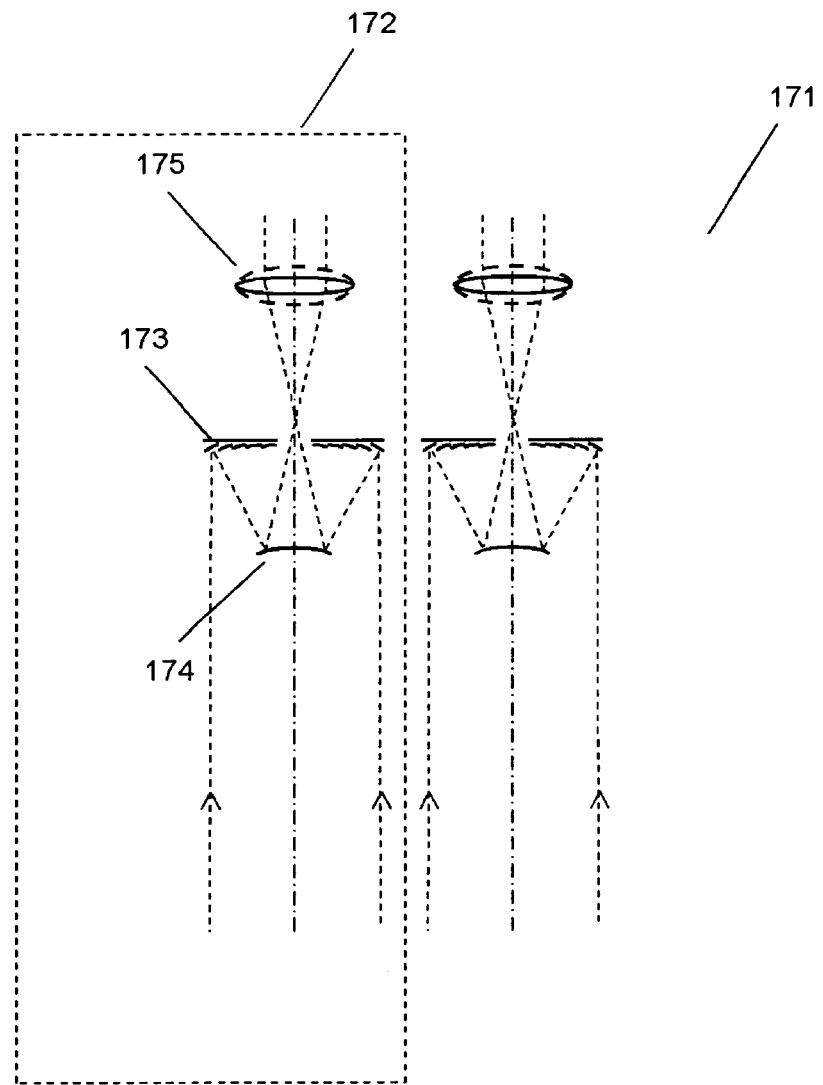
FIG. 17 is a schematic diagram of Cassegrainian telescope type zoom binoculars with micromirror array reflectors using variable focus lenses, wherein each ocular lens group comprises at least one variable focus lens.

FIG. 17 is a schematic diagram of Cassegrainian telescope type zoom binoculars 171 with micromirror array reflectors using variable focus lenses, wherein each ocular lens group comprises at least one variable focus lens similar to the embodiment of FIG. 10. In each optical unit 172, the first reflector element is a micromirror array reflector 173 working as a variator configured to change the magnification of the optical unit by forming a plurality of optical surface profiles reproducing parabolic concave mirrors, the second reflector element is a hyperbolic convex mirror 174, and the ocular lens group comprises at least one variable focus lens 175 working as a compensator configured to maintain the focus of the optical unit 172 by changing its focal length.

Although FIG. 17 shows only one embodiment of the Cassegrainian telescope type zoom binoculars with micromirror array reflectors using variable focus lenses, wherein each ocular lens group comprises at least one variable focus lens, the one skilled in art will understand that many variations are possible for the Cassegrainian telescope type zoom binoculars with micromirror array reflectors using variable focus lenses. In one embodiment, the first reflector element is a micromirror array reflector working as a compensator by forming a plurality of optical surface profiles reproducing parabolic concave mirrors, the second reflector element is a hyperbolic convex mirror, and the ocular lens group comprises at least one variable focus lens working as a variator. In another embodiment, the first reflector element is a parabolic concave mirror, the second reflector element is a micromirror array reflector working as a variator by forming a plurality of optical surface profiles reproducing hyperbolic convex mirrors, and the ocular lens group comprises at least one variable focus lens working as a compensator. In still another embodiment, the first reflector element is a parabolic concave mirror, the second reflector element is a micromirror array reflector working as a compensator by forming a plurality of optical surface profiles reproducing hyperbolic convex mirrors, and the ocular lens group comprises at least one variable focus lens working as a variator.

The telescope type binoculars can use Gregorian telescope configuration. The conventional Gregorian telescope uses a parabolic concave primary mirror having a fixed focal length and a curved concave secondary mirror having a fixed focal length. The primary mirror focuses light before the secondary mirror and the secondary mirror reflects the light back to the focal plane through a hole in the primary mirror. Since the configurations and operations of the Gregorian telescope type binoculars are similar to those of the Cassegrainian telescope type binoculars shown in FIGS. 13-17, only one embodiment of the Gregorian telescope type binoculars are illustrated as an example.

Figure 18:
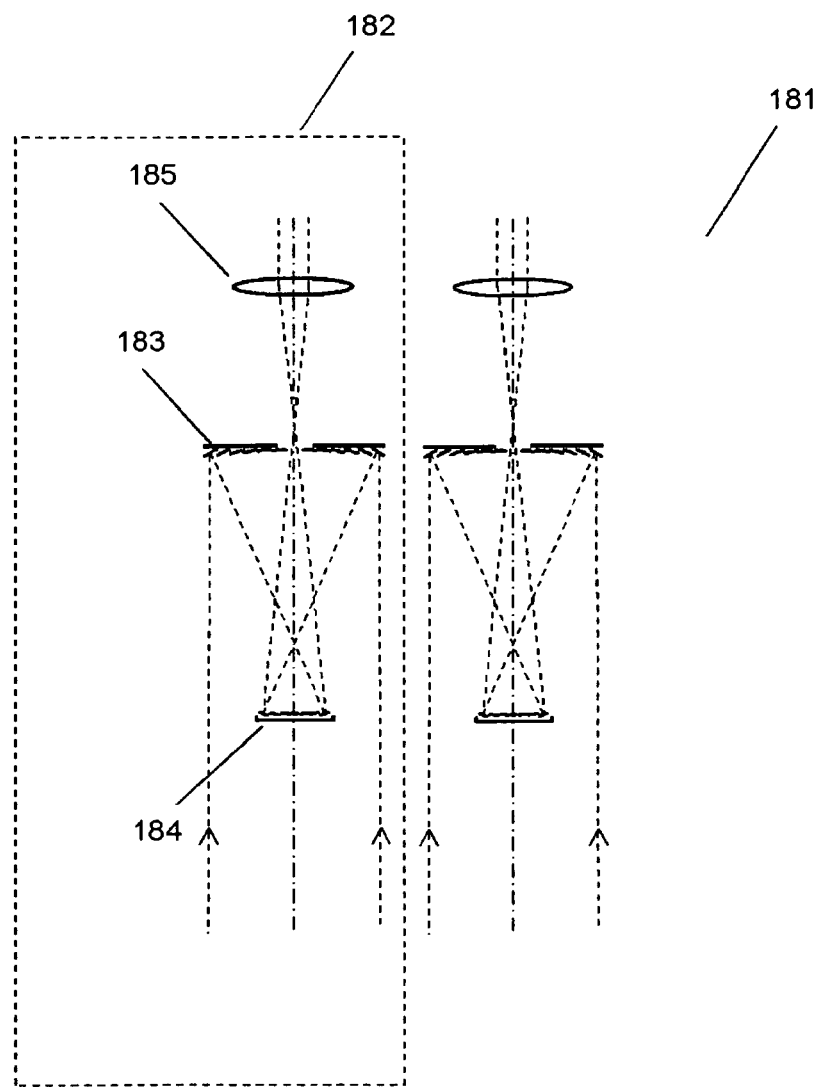
FIG. 18 is a schematic diagram of one embodiment of Gregorian telescope type zoom binoculars with micromirror array reflectors, wherein the binoculars have zoom function without macroscopic mechanical lens movement.

FIG. 18 is a schematic diagram of one embodiment of Gregorian telescope type zoom binoculars 181 with micromirror array reflectors, wherein the binoculars have zoom function without macroscopic mechanical mirror movement. As an exemplary embodiment, illustrated is a case of the Cassegrainian telescope type zoom binoculars 181, wherein in each optical unit 182, the first reflector elements is a first micromirror array reflector 183 forming a plurality of optical surface profiles reproducing parabolic concave mirrors and the second reflector element is a second micromirror array reflector 184 forming a plurality of optical surface profiles reproducing curved concave mirrors. Each optical unit 182 may further comprise an ocular lens or lens group 185 disposed to the eye side. The first micromirror array reflector 183 is a variator to change the magnification of the optical unit 182 by changing its optical surface profile. The second micromirror array reflector 184 is a compensator to maintain the focus of the optical unit 182 throughout a zoom range by changing its optical surface profile. Each optical unit 182 may further comprise an ocular lens or lens group 185 disposed to the eye side.

The Gregorian telescope type zoom binoculars 181 of the present invention can further comprise at least one viewer magnification adjustment means (not shown) as shown in FIGS. 6A-6B. The viewer can generate a command signal by using the viewer magnification adjustment means so that the optical surface profile of the micromirror array reflector 183 is changed until the desired magnification of the optical unit 182 is obtained. The micromirror array reflector 184 can be configured to change its optical surface profile automatically to maintain the focus of the optical unit 182 as the micromirror array reflector 183 is changed. Alternatively, the optical surface profile of the second micromirror array reflector 184 is changed by the viewer using the viewer focus adjustment means (not shown) in order to maintain the focus of the optical unit 182 until the focused image of the object is obtained.

Although FIG. 18 shows how zoom function is performed by using the example that the first micromirror array reflector 183 works as a variator and the second micromirror array reflector 184 works as a compensator, the one skilled in the art will understands that the first micromirror array reflector 183 and the second micromirror array reflector 184 can work as a compensator and a variator, respectively to perform zoom function. Also, the one skilled in the art will understands that both first and the second micromirror array reflectors 183, 184 can be used to change the magnification and maintain the focus of the optical unit 182 together.

Figure 19:
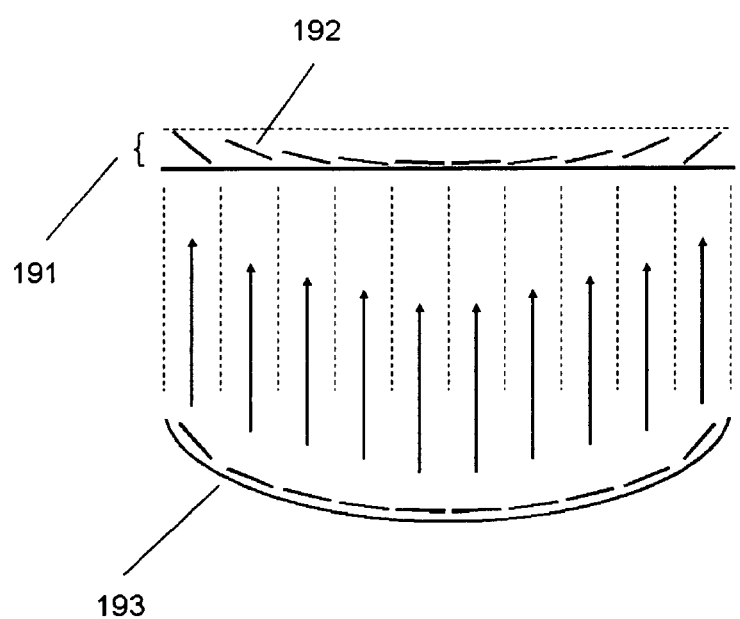
FIG. 19 is a schematic diagram showing the principle of a micromirror array reflector.

To be a good reflector, the reflector must satisfy two conditions. One is the convergence condition that all light rays scattered from one point of an object should converge into one point of an image plane. The other is the phase matching condition that all converging light rays should have the same phase at the image plane. To satisfy the reflector conditions, the surfaces of conventional reflectors are formed to have all light rays scattered by one point of an object be converged into one point of the image plane and have the optical path length of all converging light rays be the same. The micromirror array reflector satisfies these conditions in a different way. FIG. 19 is a schematic diagram showing the principle of a micromirror array reflector. The micromirror array reflector 191 comprises a plurality of micromirrors 192 and replaces an ordinary single-bodied optical surface 193. The micromirror array reflector 191 forms a reflective Fresnel reflector or a diffractive Fresnel reflector that satisfies the focusing properties of the ordinary single-bodied optical surface 193.

Since each micromirror has the same function as a mirror, the reflective surface of the micromirror is made of metal, metal compound, multi-layered dielectric material, or other materials with high reflectivity such as aluminum coated with multi-layer dielectric material, aluminum coated with anti-oxidant, silver coated with multi-layer dielectric material, silver coated with antioxidant, gold, and gold coated with multi-layer dielectric material. The surface of the micromirror can be made to have high reflectivity using many known microfabrication processes.

The micromirrors in the micromirror array reflector can have various shapes including fan shape, triangular shape, rectangular shape, square shape, hexagonal shape, and circular shape depending on the geometry of the optical element that the micromirror array reflector reproduces. A micromirror array reflector comprising fan shape micromirrors is appropriate to reproduce revolution symmetric free surfaces. A micromirror array reflector comprising square or rectangular shape micromirrors is appropriate to reproduce line symmetric free surfaces. Also, a micromirror array reflector comprising triangular or hexagonal shape micromirrors is appropriate to reproduce rotational symmetric free surfaces such as with six-fold rotational symmetry or with arbitrary shape and/or size.

Figure 20:
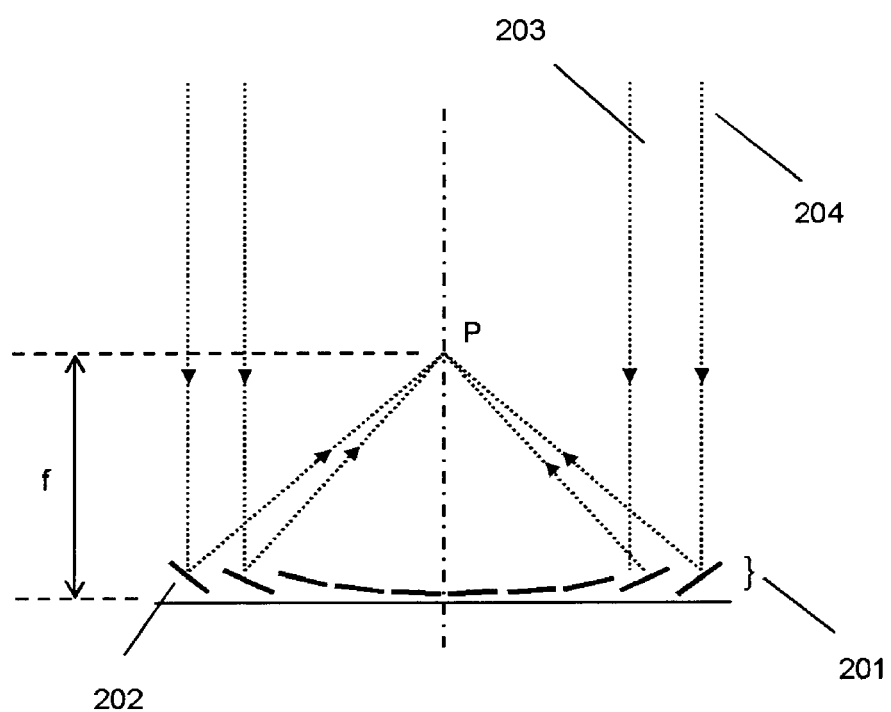
FIG. 20 is a schematic diagram showing a micromirror array reflector forming an optical surface profile to satisfy convergence condition and/or phase matching condition.

FIG. 20 is a schematic diagram showing a micromirror array reflector 201 forming optical surface profiles to satisfy convergence condition and/or phase matching condition. The optical surface profile of the micromirror array reflector 201 comprising micromirrors 202 satisfies the convergence condition, wherein arbitrary scattered light rays 203, 204 are converged into one point P on an image plane by adjusting the rotational and/or translational motions of each micromirror. Also, the surface profile of the micromirror array reflector 201 satisfies the phase matching condition, wherein the phases of all converging light rays at the converging point P on the image plane are adjusted to be the same by controlling the rotational and/or translational motion of each micromirror 202. Even though the optical path lengths of light rays 203, 204 converged by the micromirror array reflector 201 are different from those of an equivalent conventional, the same phase condition is satisfied by adjusting the phases of light rays 203, 204 because the phase of light is periodic. The required maximum translational displacement is at least half wavelength of light.

Figure 21:
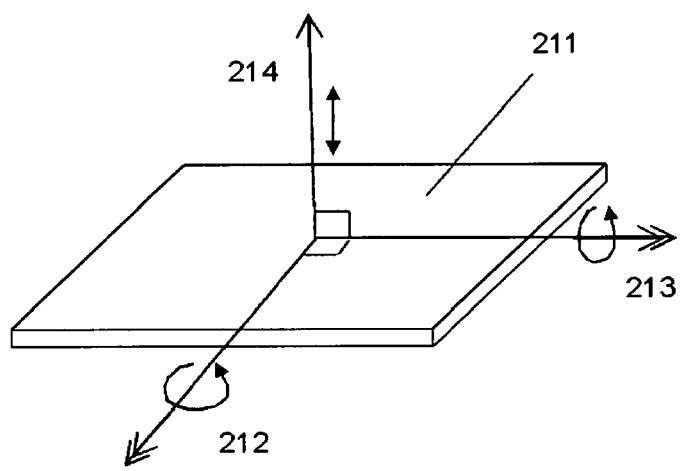
FIG. 21 is a schematic diagram showing a micromirror having two degrees of freedom rotation and one degree of freedom translation.

FIG. 21 is a schematic diagram showing a micromirror 211 having two degrees of freedom rotation 212, 213 and one degree of freedom translation 214. The micromirror array reflector comprising the micromirrors 211 with two degree of freedoms rotation 212, 213 and one degree of freedom translation 214, which are controlled independently, makes an reflector with arbitrary shape and/or size. Incident light is deflected to an arbitrary direction by controlling two degree of freedoms rotation 212, 213 and the phase of the incident light is adjusted by controlling one degree of freedom translation 214 of each micromirror 211.

The general principle, methods for making the micromirror array devices and micromirror array reflector, and their applications are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934,133 filed Sep. 3, 2004, U.S. patent application Ser. No. 10/979,619 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, U.S. patent application Ser. No. 11/419,480 filed May 19, 2006, U.S. patent application Ser. No. 11/423,333 filed Jun. 9, 2006, all of which are incorporated herein by references.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A pair of binoculars with micromirror array reflector comprising two optical units, wherein each of the optical units comprises a first reflector element disposed to reflect light from object and a second reflector element disposed to reflect the light reflected from the first reflector element to eye side, wherein at least one of the reflector elements is a micromirror array reflector comprising a plurality of micromirrors, wherein each micromirror is configured to have two degrees of freedom rotational motion and one degree of freedom translational motion, wherein the micromirror array reflector is configured to have a plurality of optical surface profiles by controlling the motions of the micromirrors.

2. The binoculars with micromirror array reflector of claim 1, wherein each optical surface profile of the micromirror array reflector reproduces a reflective optical surface with a predetermined optical property.

3. The binoculars with micromirror array reflector of claim 2, wherein each optical surface profile of the micromirror array reflector satisfies convergence condition and phase matching condition.

4. The binoculars with micromirror array reflector claim 1, wherein each of the optical units comprises an objective lens or lens group disposed to an object side.

5. The binoculars with micromirror array reflector of claim 4, wherein the objective lens group comprises at least one movable lens working as a variator to change magnification of the optical unit by changing position of the movable lens.

6. The binoculars with micromirror array reflector of claim 4, wherein the objective lens group comprises at least one movable lens working as a compensator to maintain focus of the optical unit by changing position of the movable lens.

7. The binoculars with micromirror array reflector of claim 4, wherein the objective lens group comprises at least one variable focus lens working as a variator to change magnification of the optical unit by changing the focal length of the variable focus lens.

8. The binoculars with micromirror array reflector of claim 4, wherein the objective lens group comprises at least one variable focus lens working as a compensator to maintain focus of the optical unit by changing the focal length of the variable focus lens.

9. The binoculars with micromirror array reflector claim 1, wherein each of the optical units comprises an ocular lens or lens group disposed to the eye side.

10. The binoculars with micromirror array reflector of claim 9, wherein the ocular lens group comprises at least one movable lens working as a variator to change magnification of the optical unit by changing position of the movable lens.

11. The binoculars with micromirror array reflector of claim 9, wherein the ocular lens group comprises at least one movable lens working as a compensator to maintain focus of the optical unit by changing position of the movable lens.

12. The binoculars with micromirror array reflector of claim 9, wherein the ocular lens group comprises at least one variable focus lens working as a variator to change magnification of the optical unit by changing the focal length of the variable focus lens.

13. The binoculars with micromirror array reflector of claim 9, wherein the ocular lens group comprises at least one variable focus lens working as a compensator to maintain focus of the optical unit by changing the focal length of the variable focus lens.

14. The binoculars with micromirror array reflector claim 1, wherein each of the optical units comprises an erect lens or lens group.

15. The binoculars with micromirror array reflector of claim 1, wherein each optical unit further comprises a beam splitter, wherein the beam splitter is disposed between the first reflector element and the second reflector element.

16. The binoculars with micromirror array reflector of claim 1, wherein the micromirror array reflector is configured to change focus of the optical unit by changing the optical surface profiles of the micromirror array reflector.

17. The binoculars with micromirror array reflector of claim 1, wherein the micromirror array reflector is a variator configured to change magnification of the optical unit by changing the optical surface profiles of the micromirror array reflector.

18. The binoculars with micromirror array reflector of claim 1, wherein the micromirror array reflector is a compensator configured to maintain focus of the optical unit by changing the optical surface profiles of the micromirror array reflector.

19. The binoculars with micromirror array reflector of claim 1, wherein the first reflector element has an opening, wherein the light can pass through the first reflector element.

20. The binoculars with micromirror array reflector of claim 1, wherein the first reflector element is a first micromirror array reflector and the second reflector element is a second micromirror array reflector.

21. The binoculars with micromirror array reflector of claim 1, wherein the binoculars with micromirror array reflector comprise at least one viewer adjustment means, wherein viewer adjusts the optical surface profiles of the micromirror array reflectors by the viewer adjustment means.

22. The binoculars with micromirror array reflector of claim 1, wherein a distance between the optical units can be changed.

23. A pair of binoculars with micromirror array reflector having zoom function without macroscopic mechanical lens movement, wherein the binoculars comprise two optical units, wherein each of the optical units comprises a first micromirror array reflector and a second micromirror array reflector, wherein each micromirror array reflector comprises a plurality of micromirrors and is configured to have a plurality of optical surface profiles by controlling motions of the micromirrors in the micromirror array reflector, wherein the first micromirror array reflector is configured to change magnification of the optical unit by changing the optical surface profile of the first micromirror array reflector, wherein the second micromirror array reflector is configured to maintain focus of the optical unit by changing the optical surface profile of the second micromirror array reflector.

24. A pair of binoculars with micromirror array reflector having focusing function without macroscopic mechanical lens movement, wherein the binoculars comprise two optical units, wherein each of the optical units comprises a mirror and a micromirror array reflector, wherein the micromirror array reflector is configured to have a plurality of optical surface profiles by controlling motions of the micromirrors in the micromirror array reflector, wherein the micromirror array reflector is configured to change focus of the optical unit by changing the optical surface profiles of the micromirror array reflector.

* * * * *